United States Patent
Shinada

(10) Patent No.: US 9,832,702 B2
(45) Date of Patent: Nov. 28, 2017

(54) BASE STATION DEVICE, MOBILE TERMINAL, AND RADIO COMMUNICATION SYSTEM

(71) Applicant: FUJITSU LIMITED, Kawasaki-shi, Kanagawa (JP)

(72) Inventor: Yuki Shinada, Warabi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/988,282

(22) Filed: Jan. 5, 2016

(65) Prior Publication Data

US 2016/0135106 A1    May 12, 2016

Related U.S. Application Data

(63) Continuation of application No. PCT/JP2013/071184, filed on Aug. 5, 2013.

(51) Int. Cl.
| | |
|---|---|
| *H04W 36/04* | (2009.01) |
| *H04W 36/32* | (2009.01) |
| *H04W 16/32* | (2009.01) |
| *H04W 36/00* | (2009.01) |

(52) U.S. Cl.
CPC .......... *H04W 36/32* (2013.01); *H04W 16/32* (2013.01); *H04W 36/0083* (2013.01); *H04W 36/04* (2013.01); *H04W 36/0061* (2013.01)

(58) Field of Classification Search
CPC ..... H04W 16/32; H04W 36/04; H04W 36/00; H04W 36/0083; H04W 72/0433; H04W 24/00
USPC ........ 455/440, 434; 370/252, 329, 349, 350, 370/331
See application file for complete search history.

(56) References Cited

U.S. PATENT DOCUMENTS

| | | | |
|---|---|---|---|
| 8,391,872 B1 | 3/2013 | Shetty et al. | |
| 2003/0117994 A1* | 6/2003 | Fujii | G04R 20/18 370/349 |
| 2011/0117917 A1 | 5/2011 | Gresset et al. | |
| 2011/0294508 A1 | 12/2011 | Min et al. | |
| 2011/0319086 A1 | 12/2011 | Katori | |

(Continued)

FOREIGN PATENT DOCUMENTS

| | | |
|---|---|---|
| JP | 2011-109666 A | 6/2011 |
| JP | 2013-31224 A | 2/2013 |

(Continued)

OTHER PUBLICATIONS

Extended European search report with supplementary European search report and the European search opinion issued by the European Patent Office for corresponding European Patent Application No. 13891077.3, dated Jun. 22, 2016.

(Continued)

*Primary Examiner* — Phuoc H Doan
(74) *Attorney, Agent, or Firm* — Myers Wolin, LLC

(57) ABSTRACT

A base station device is able to perform radio communication with a mobile terminal that exists in a first cell, and includes a memory and a transmitter. The memory stores therein position information on a second cell that can be a move destination for the mobile terminal. The transmitter transmits the position information on the second cell to the mobile terminal so as to cause the mobile terminal to detect that the mobile terminal has approached the second cell using the position information.

9 Claims, 29 Drawing Sheets

(56) References Cited

U.S. PATENT DOCUMENTS

2012/0201159 A1* 8/2012 Morita .............. H04W 72/082
370/252
2014/0301372 A1 10/2014 Fukuta

FOREIGN PATENT DOCUMENTS

| JP | 2013-526239 A | 6/2013 |
| WO | 2011/149316 A1 | 12/2011 |
| WO | 2013/065842 A1 | 5/2013 |

OTHER PUBLICATIONS

Nokia Siemens Networks et al., "Enhancements for Small Cell Detection", Agenda Item: 7.10.3, 3GPP TSG-RAN WG2 Meeting #77, R2-120523, Dresden, Germany, Feb. 6-10, 2012.
International Search Report issued for corresponding International Patent Application No. PCT/JP2013/071184 dated Oct. 8, 2013.
Written Opinion of the International Searching Authority issued for corresponding International Patent Application No. PCT/JP2013/071184 dated Oct. 8, 2013, with an English translation.
Communication pursuant to Article 94(3) EPC issued by the European Patent Office for corresponding European Patent Application No. 13 891 077.3-1854, dated Aug. 24, 2011.

* cited by examiner

41

| PHYSICAL CELL ID | POSITION INFORMATION | FREQUENCY BAND | CELL RADIUS |
|---|---|---|---|
| AAA | 35.730541xx/139.71294yy | 2.2GHz | 500m |
| BBB | 35.730551xx/139.71304yy | 2.2GHz | 1000m |

42

| PHYSICAL CELL ID | POSITION INFORMATION | FREQUENCY BAND | CELL RADIUS |
|---|---|---|---|
| aaa | 35.730542xx/139.71295yy | 800MHz | 10m |
| bbb | 35.730543xx/139.71296yy | 900MHz | 5m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |
| fff | 35.730547xx/139.71300yy | 900MHz | 5m |

F I G. 7

F I G. 10

| PHYSICAL CELL ID | POSITION INFORMATION | FREQUENCY BAND | CELL RADIUS | ALLOCATED-SMALL-CELL INFORMATION |
|---|---|---|---|---|
| AAA | 35.730541xx/139.71294yy | 2.2GHz | 500m | |

43a

| PHYSICAL CELL ID | POSITION INFORMATION | FREQUENCY BAND | CELL RADIUS | ALLOCATED-SMALL-CELL INFORMATION |
|---|---|---|---|---|
| AAA | 35.730541xx/139.71294yy | 2.2GHz | 500m | aaa |

43b

| PHYSICAL CELL ID | POSITION INFORMATION | FREQUENCY BAND | CELL RADIUS | ALLOCATED-SMALL-CELL INFORMATION |
|---|---|---|---|---|
| AAA | 35.730541xx/139.71294yy | 2.2GHz | 500m | aaa |
| | | | | bbb |
| | | | | ccc |
| | | | | ddd |
| | | | | eee |
| BBB | 35.730551xx/139.71304yy | 2.2GHz | 1000m | bbb |
| | | | | ddd |
| | | | | fff |

43c

| PHYSICAL CELL ID | POSITION INFORMATION | FREQUENCY BAND | CELL RADIUS | ALLOCATED-SMALL-CELL INFORMATION |
|---|---|---|---|---|
| aaa | 35.730542xx/ 139.71295yy | 800MHz | 10m | bbb |
| | | | | ccc |
| | | | | ddd |
| | | | | eee |

~44a

| PHYSICAL CELL ID | POSITION INFORMATION | FREQUENCY BAND | CELL RADIUS | ALLOCATED-SMALL-CELL INFORMATION |
|---|---|---|---|---|
| aaa | 35.730542xx/ 139.71295yy | 800MHz | 10m | bbb |
| | | | | ccc |
| | | | | ddd |
| | | | | eee |
| bbb | 35.730543xx/ 139.71296yy | 900MHz | 5m | aaa |
| | | | | ccc |
| | | | | ddd |
| | | | | eee |
| | | | | fff |
| ccc | 35.730544xx/ 139.71297yy | 800MHz | 10m | aaa |
| | | | | bbb |
| | | | | ddd |
| | | | | eee |
| ddd | 35.730545xx/ 139.71298yy | 800MHz | 10m | aaa |
| | | | | bbb |
| | | | | ccc |
| | | | | eee |
| | | | | fff |
| eee | 35.730546xx/ 139.71299yy | 800MHz | 10m | aaa |
| | | | | bbb |
| | | | | ccc |
| | | | | ddd |
| fff | 35.730547xx/ 139.71300yy | 900MHz | 5m | bbb |
| | | | | ddd |

~44b

F I G. 1 2

| PHYSICAL CELL ID | POSITION INFORMATION | FREQUENCY BAND | CELL RADIUS |
|---|---|---|---|
| aaa | 35.730542xx/139.71295yy | 800MHz | 10m |
| bbb | 35.730543xx/139.71296yy | 900MHz | 5m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |

FIG. 14

| PHYSICAL CELL ID | POSITION INFORMATION | FREQUENCY BAND | CELL RADIUS |
|---|---|---|---|
| aaa | 35.730542xx/139.71295yy | 800MHz | 10m |
| bbb | 35.730543xx/139.71296yy | 900MHz | 5m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |

~21A

| PHYSICAL CELL ID | POSITION INFORMATION | FREQUENCY BAND | CELL RADIUS |
|---|---|---|---|
| bbb | 35.730543xx/139.71296yy | 900MHz | 5m |
| ddd | 35.730545xx/139.71298yy | 800MHz | 10m |
| fff | 35.730547xx/139.71300yy | 900MHz | 5m |

~21B

| PHYSICAL CELL ID | POSITION INFORMATION | FREQUENCY BAND | CELL RADIUS |
|---|---|---|---|
| bbb | 35.730543xx/139.71296yy | 900MHz | 5m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |

~21a

| PHYSICAL CELL ID | POSITION INFORMATION | FREQUENCY BAND | CELL RADIUS |
|---|---|---|---|
| aaa | 35.730542xx/139.71295yy | 800MHz | 10m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |
| fff | 35.730547xx/139.71300yy | 900MHz | 5m |

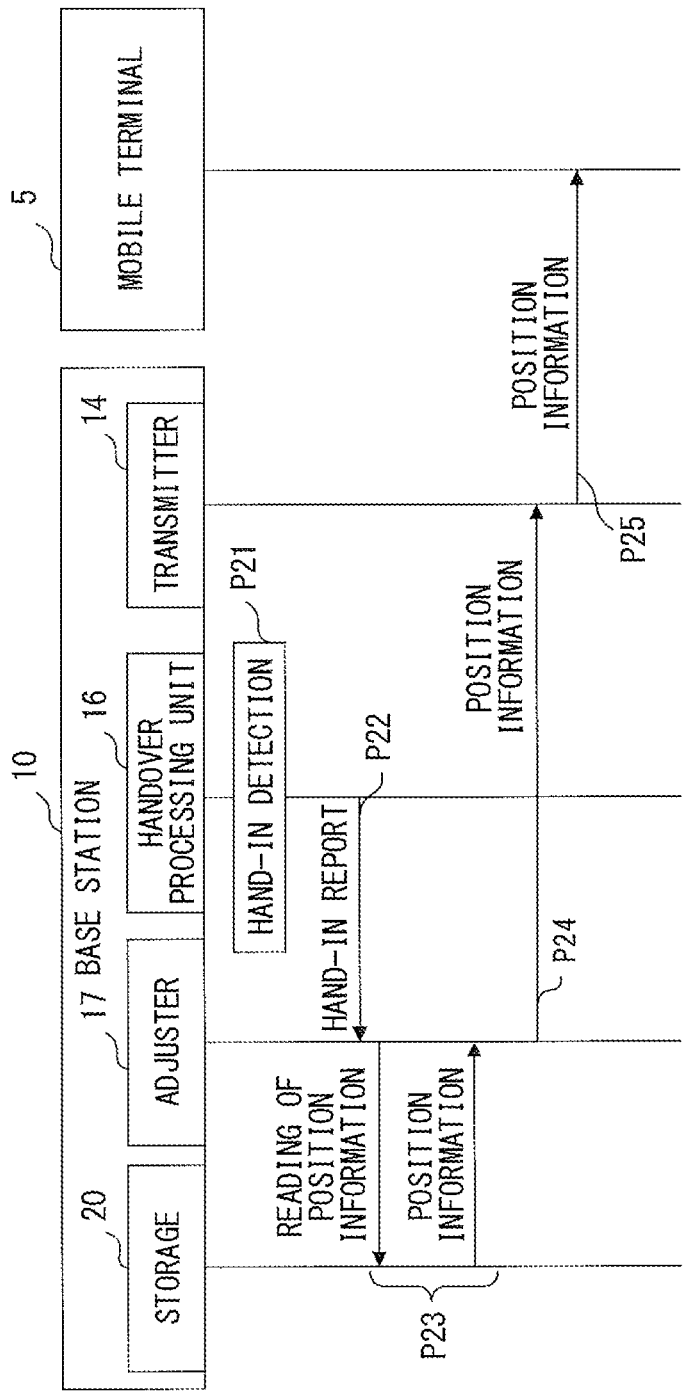
F I G. 1 7

| PHYSICAL CELL ID | POSITION INFORMATION | FREQUENCY BAND | CELL RADIUS |
|---|---|---|---|
| bbb | 35.730543xx/139.71296yy | 900MHz | 5m |
| ddd | 35.730545xx/139.71298yy | 800MHz | 10m |
| fff | 35.730547xx/139.71300yy | 900MHz | 5m |

~71a

| PHYSICAL CELL ID | POSITION INFORMATION | FREQUENCY BAND | CELL RADIUS |
|---|---|---|---|
| aaa | 35.730542xx/139.71295yy | 800MHz | 10m |
| bbb | 35.730543xx/139.71296yy | 900MHz | 5m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |

~21A

| PHYSICAL CELL ID | POSITION INFORMATION | FREQUENCY BAND | CELL RADIUS |
|---|---|---|---|
| aaa | 35.730542xx/139.71295yy | 800MHz | 10m |
| bbb | 35.730543xx/139.71296yy | 900MHz | 5m |
| ccc | 35.730544xx/139.71297yy | 800MHz | 10m |
| ddd | 35.730545xx/139.71298yy | 800MHz | 10m |
| eee | 35.730546xx/139.71299yy | 800MHz | 10m |

~71b

| PHYSICAL CELL ID | POSITION INFORMATION | FREQUENCY BAND | CELL RADIUS |
|---|---|---|---|
| aaa | 35.730542xx/139.71295yy | 800MHz | 10m |
| bbb | 35.730543xx/139.71296yy | 900MHz | 5m |
| ddd | 35.730545xx/139.71298yy | 800MHz | 10m |
| eee | 35.730546xx/139.71299yy | 800MHz | 10m |

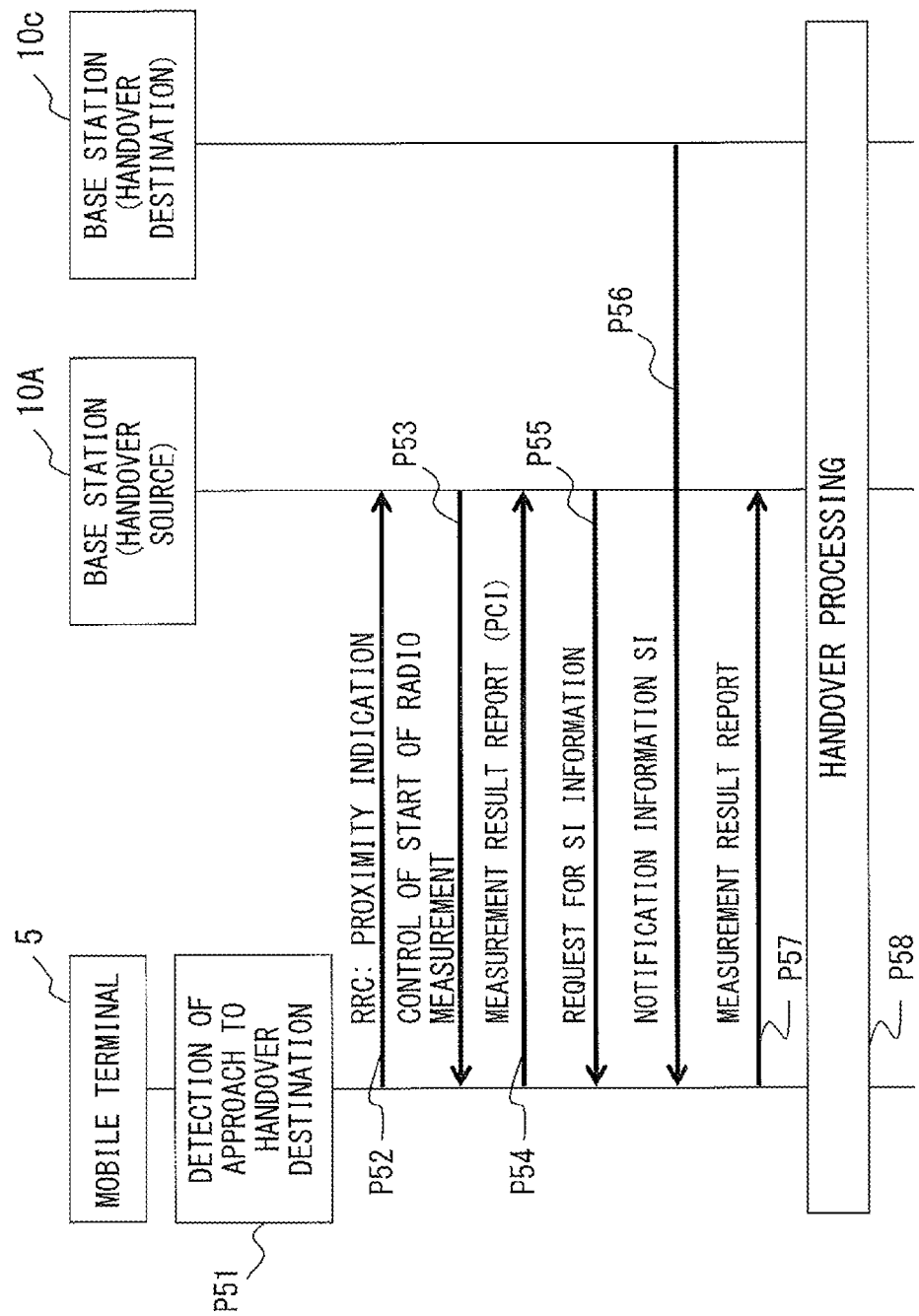
F I G. 21

F I G. 24

| PHYSICAL CELL ID | POSITION INFORMATION | FREQUENCY BAND | CELL RADIUS | SECTOR NUMBER | ALLOCATED-SMALL-CELL INFORMATION |
|---|---|---|---|---|---|
| AAA | 35.730541xx/ 139.71294yy | 2.2GHz | 500m | 1 | bbb |
| | | | | 2 | bbb |
| | | | | 3 | ddd |
| | | | | 4 | eee |
| | | | | 5 | ccc |
| | | | | 6 | aaa |
| BBB | 35.730541xx/ 139.71294yy | 2.2GHz | 1000m | 1 | aaa |
| | | | | 2 | fff |
| | | | | 3 | fff |
| | | | | 4 | - |
| | | | | 5 | bbb |
| | | | | | ddd |
| | | | | 6 | - |

43d

| PHYSICAL CELL ID | POSITION INFORMATION | FREQUENCY BAND | CELL RADIUS | ALLOCATED-SMALL-CELL INFORMATION |
|---|---|---|---|---|
| aaa | 35.730542xx/139.71295yy | 800MHz | 10m | - |
| bbb | 35.730543xx/139.71296yy | 900MHz | 5m | ddd |
| ccc | 35.730544xx/139.71297yy | 800MHz | 10m | - |
| ddd | 35.730545xx/139.71298yy | 800MHz | 10m | bbb |
| eee | 35.730546xx/139.71299yy | 800MHz | 10m | - |
| fff | 35.730547xx/139.71300yy | 900MHz | 5m | - |

FIG. 26

| TERMINAL IDENTIFIER | BASE STATION TIMER (SEC) | SPEED TIMER (SEC) | PRIORITY TIMER (SEC) | TIMER (SEC) |
|---|---|---|---|---|
| 11111111 | 5 | 0 | SPEED | 0 |
| 22222222 | 5 | 5 | SPEED | 5 |
| 33333333 | 5 | 10 | SPEED | 10 |
| 44444444 | 5 | 0 | SPEED | 0 |

F I G. 2 8

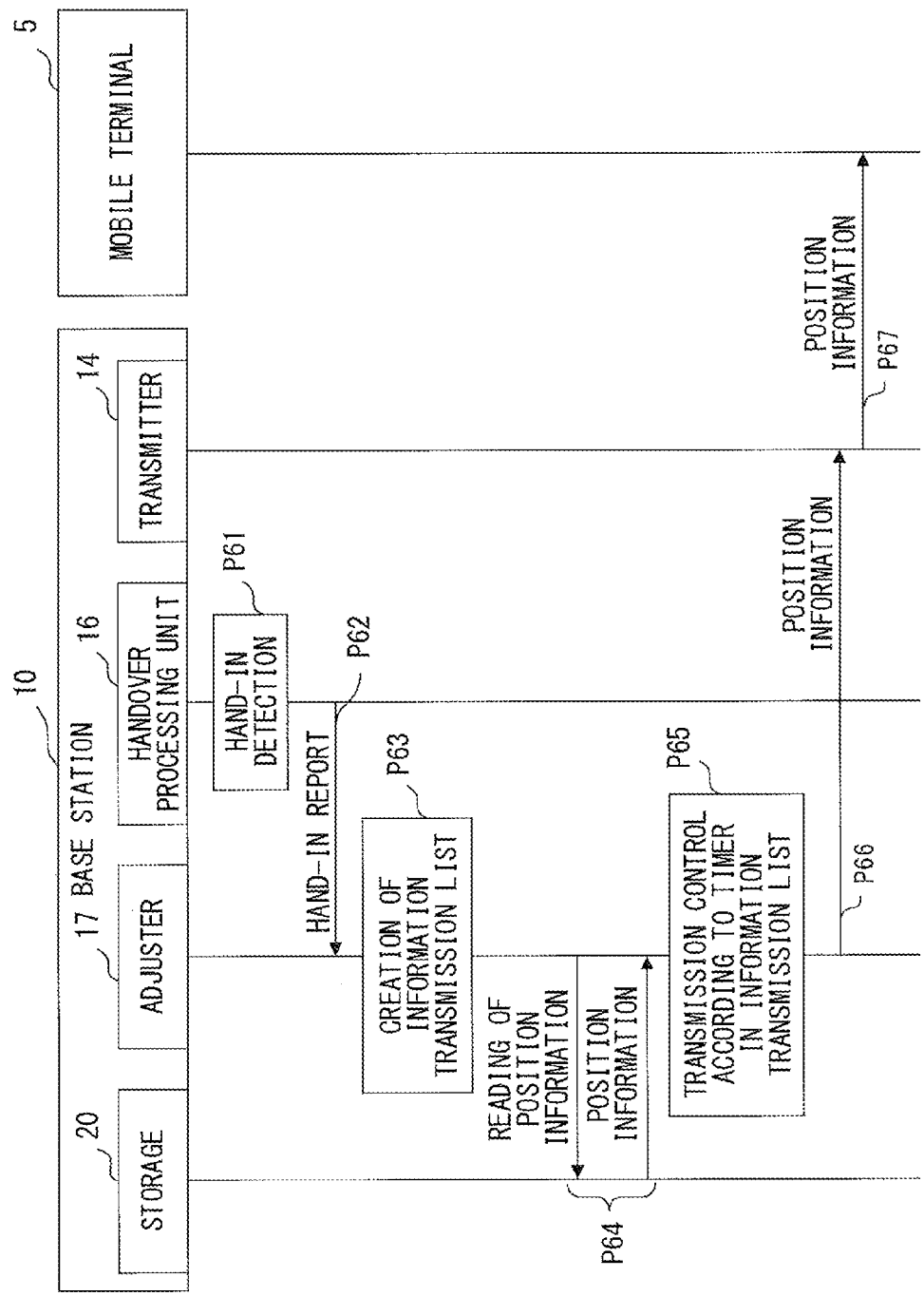
F I G. 29

BASE STATION DEVICE, MOBILE TERMINAL, AND RADIO COMMUNICATION SYSTEM

CROSS-REFERENCE TO RELATED APPLICATIONS

This application is a continuation application of International Application PCT/JP2013/071184 filed on Aug. 5, 2013 and designated the U.S., the entire contents of which are incorporated herein by reference.

FIELD

The embodiments discussed herein are related to communication between a mobile terminal and a base station.

BACKGROUND

In recent years, a small cell has been used in order to accommodate the increased data traffic. In this case, "small cell" refers to a cell that has a shorter cell radius or whose number of users that is able to access the cell is smaller compared with a macrocell. A small cell may be established in a macrocell in order to accommodate an increased number of users of the macrocell or increased communications traffic per user. In this case, in order to mitigate interference between the macrocell and the small cell, the small cell is often established so as to perform communication using a frequency bandwidth that is different from a bandwidth used in the macrocell including the small cell.

In order to hand over to a base station of a small cell, a mobile terminal identifies a physical cell ID (PCI, physical cell identifier) allocated to a small cell that is a handover destination. At this point, the mobile terminal performs processing in a frequency bandwidth which the small cell that is a handover destination uses for communication. Thus, a mobile terminal that tries to obtain, during communication with a macrocell, information on a small cell that is a handover destination will perform the processing both in a frequency bandwidth used for communication through the macrocell and in a frequency bandwidth used for communication in the small cell. However, when a mobile terminal performs communication processing in a plurality of frequency bandwidths, power consumption of the mobile terminal increases. Further, a mobile terminal that is located away from a small cell repeats the processing until a physical cell ID is obtained, so power consumption for searching for the small cell further increases.

Therefore, a method in which a mobile terminal determines whether a small cell is in its proximity using fingerprint information has been proposed. The fingerprint information is information generated when a mobile terminal exists in a small cell and stored in a recording medium of a mobile terminal, and includes position information on the small cell such as the position information on the mobile terminal when it existed in the small cell. The mobile terminal identifies a physical cell ID with respect to a small cell determined to be in its proximity, by comparing the position information in a fingerprint stored in the recording medium with a current position of the mobile terminal.

As a related technology, a mobile terminal that stores therein a list indicating an accessible small cell has been devised. When receiving a network policy from a base station, this mobile terminal determines whether a small cell is positionally accessible, using information on an accessible small cell included in the list. Here, fingerprint information is used as information on an accessible small cell. The mobile terminal reports a determination result to the base station. Further, a method in which a base station determines a handover destination for a mobile terminal has also been proposed. In this method, abase station that determines a handover destination reduces, by use of a fingerprint table, the size of a list of a base station that transfers the same physical cell identifier, and identifies a handover destination.

Patent Document 1: Japanese Laid-open Patent Publication No. 2013-31224

Patent Document 2: Japanese Laid-open Patent Publication No. 2011-109666

In a communication method that uses fingerprint information, when determining that there is a small cell in its proximity using fingerprint information, a mobile terminal starts searching for the small cell. However, the conventional fingerprint information does not include the information on a cell in which the mobile terminal has not existed before. Thus, when using the conventional fingerprint method, a mobile terminal has difficulty in efficiently finding a small cell in which the mobile terminal has not existed before. On the other hand, when searching for a small cell that is a handover destination without using the fingerprint method, a mobile terminal performs search processing even when it is located away from the small cell, so the search processing is not efficiently performed, and further, power consumption of the mobile terminal increases. A method that permits a mobile terminal to efficiently search for a cell established in a bandwidth that is different from a bandwidth used for communication has not been obtained as well.

SUMMARY

A base station device according to an aspect of the present invention is able to perform radio communication with a mobile terminal that exists in a first cell, and includes a memory and a transmitter. The memory stores therein position information on a second cell that can be a move destination for the mobile terminal. The transmitter transmits the position information on the second cell to the mobile terminal so as to cause the mobile terminal to detect that the mobile terminal has approached the second cell using the position information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates examples of a macrocell information table and a small cell information table;

FIG. 10 illustrates examples of the macrocell management table;

FIG. 12 illustrates examples of the small cell management table;

FIG. 14 illustrates an example of move-destination-cell information;

FIG. 16 illustrates examples of a position information table;

FIG. 17 is a sequence diagram that illustrates an example of processing performed when the base station reports position information to the mobile terminal;

FIG. 19 illustrates examples of the position information table;

FIG. 21 is a sequence diagram that illustrates an example of a handover by use of the positional information table;

FIG. 24 illustrates an example of the macrocell management table;

FIG. 26 illustrates an example of the small cell management table;

FIG. 28 illustrates an example of an information transmission list; and

FIG. 29 is a sequence diagram that illustrates an example of a method for reporting position information according to a third embodiment.

DESCRIPTION OF EMBODIMENTS

Figure 1:
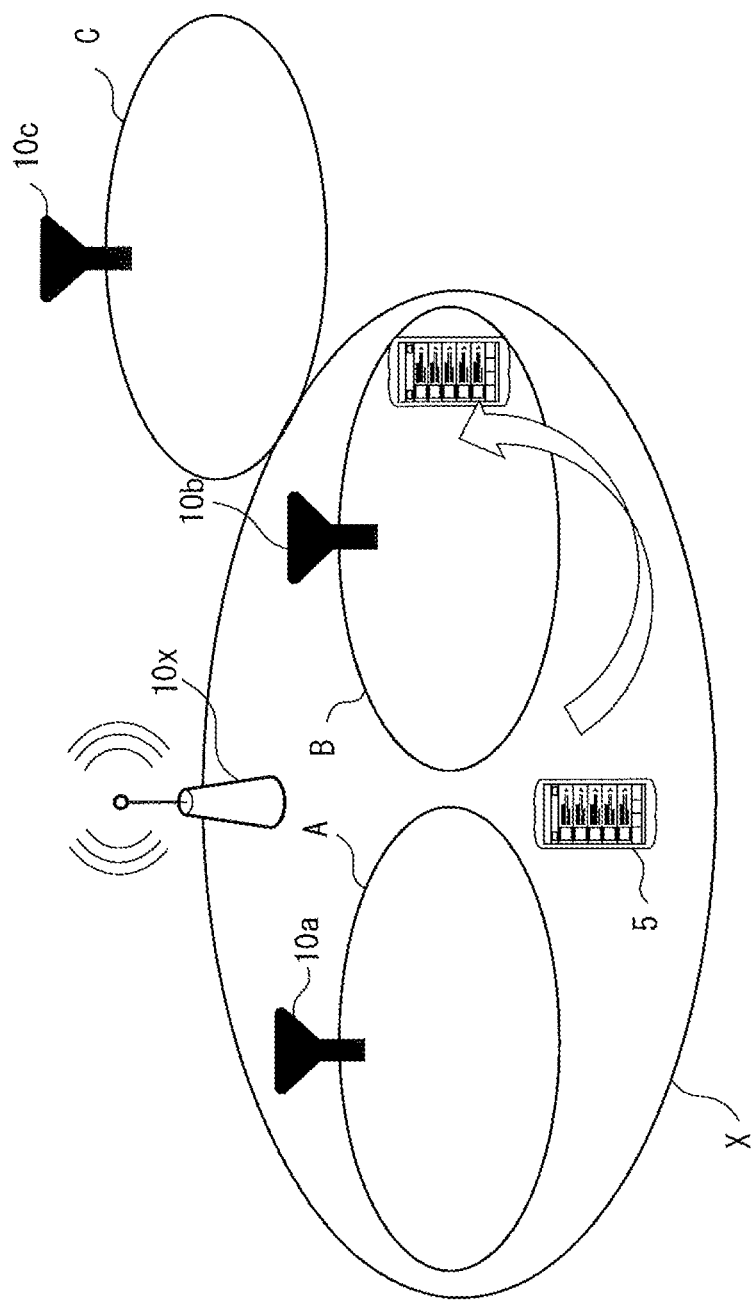
FIG. 1 illustrates an example of communication between a base station and a mobile terminal.

FIG. 1 illustrates an example of communication between a base station and a mobile terminal. In the example of FIG. 1, it is assumed that a base station 10x forms a cell X. The cell X may be a macrocell or a small cell. In the example of FIG. 1, the cell X is a macrocell. A cell smaller than a macrocell is hereinafter referred to as "small cell". For example, a small cell can be a micro cell, a pico cell, or a femto cell. A base station 10a is a base station of a small cell A, a base station 10b is a base station of a small cell B, and a base station 10c is a base station of a small cell C. In the example of FIG. 1, the small cell A and the small cell B are included in the cell X, and the small cell C is in contact with the cell X. Frequency bandwidths used for communication in the small cells A to C are set to frequency bandwidths different from that of the cell X.

Further, in the example of FIG. 1, a mobile terminal 5 has experience in communicating with the cell X, but has accessed none of the small cells A to C, and does not hold position information on any of the small cells A to C.

The base station 10x stores therein position information on a cell that can be a handover destination for the mobile terminal that is in communication with the base station 10x. In this case, the cell that can be a handover destination for the mobile terminal that is in communication with the base station 10x has any size, and shares at least one point with the cell X. The cell that can be a handover destination for the mobile terminal that is in communication with the base station 10x includes a cell included in the cell X, a cell formed in an area including a portion of the cell X, and a cell in contact with the cell X. In the example of FIG. 1, the small cell A, the small cell B, and the small cell C are a cell that can be a handover destination for the mobile terminal that is in communication with the base station 10x. Like the base station 10x, the base stations 10a to 10c, too, hold the position information on a cell that can be a handover destination for the mobile terminal that is in communication with the respective base stations.

It is assumed that the mobile terminal 5 is located in the cell X and is in communication with the base station 10x. The base station 10x transmits the position information on the small cell A, the small cell B, and the small cell C to the mobile terminal 5. The mobile terminal 5 detects that the mobile terminal 5 has approached a cell that can be a move destination by comparing position information obtained from the cell X with a position of the mobile terminal 5. For example, the mobile terminal 5 detects the small cell B as a candidate of a move destination. Then, the mobile terminal 5 identifies a physical cell ID of the small cell B after obtaining, from the base station 10x, information used to obtain information on a physical cell ID of a small cell. The mobile terminal 5 reports the physical cell ID of the small cell B to the base station 10x, and moves from the cell X to the small cell B.

When starting communicating with the mobile terminal 5, the base station 10b reports, to the mobile terminal 5, position information on a cell that can be a move destination for the mobile terminal 5. For example, the base station 10b is able to report the position information on the small cell A and the small cell C to the mobile terminal. The mobile terminal 5 is able to detect that it has approached the small cell A or the small cell C using the information obtained from the base station 10b. The mobile terminal 5 is able to appropriately make a request for the base station 10b to perform handover processing using a physical cell ID allocated to a small cell which the mobile terminal 5 has detected that it has approached.

As describe above, a mobile terminal is able to obtain, from a base station with which the mobile terminal is in communication, position information on a cell that can be a move destination. Thus, the mobile terminal is able to efficiently find even a small cell in which it has not existed before, by comparing the position information on the mobile terminal itself with the position information obtained from the base station.

A base station of a small cell may hold information on a base station that can be a move destination from a macrocell that shares one or more points with the small cell. For example, the small cell A of FIG. 1 is included in the cell X. Then, the base station 10a that forms the small cell A is able to store the position information on the small cell B and the small cell C that can be a move destination for a mobile terminal that is in communication using the cell X. Also, in this case, the mobile terminal 5 that is in communication with the base station 10a is able to efficiently find even a small cell in which it has not existed before because the mobile terminal 5 is able to obtain the position information on the small cells B and C from the base station 10a.

Further, the base stations 10a to 10c and 10x may have each stored therein position information on a small cell in advance, or may appropriately obtain position information on a small cell from, for example, a server that can be communicated through a network. As an example, a case in which a base station 10 obtains position information on a small cell from a server will now be described.

<Device Configuration>

Figure 2:
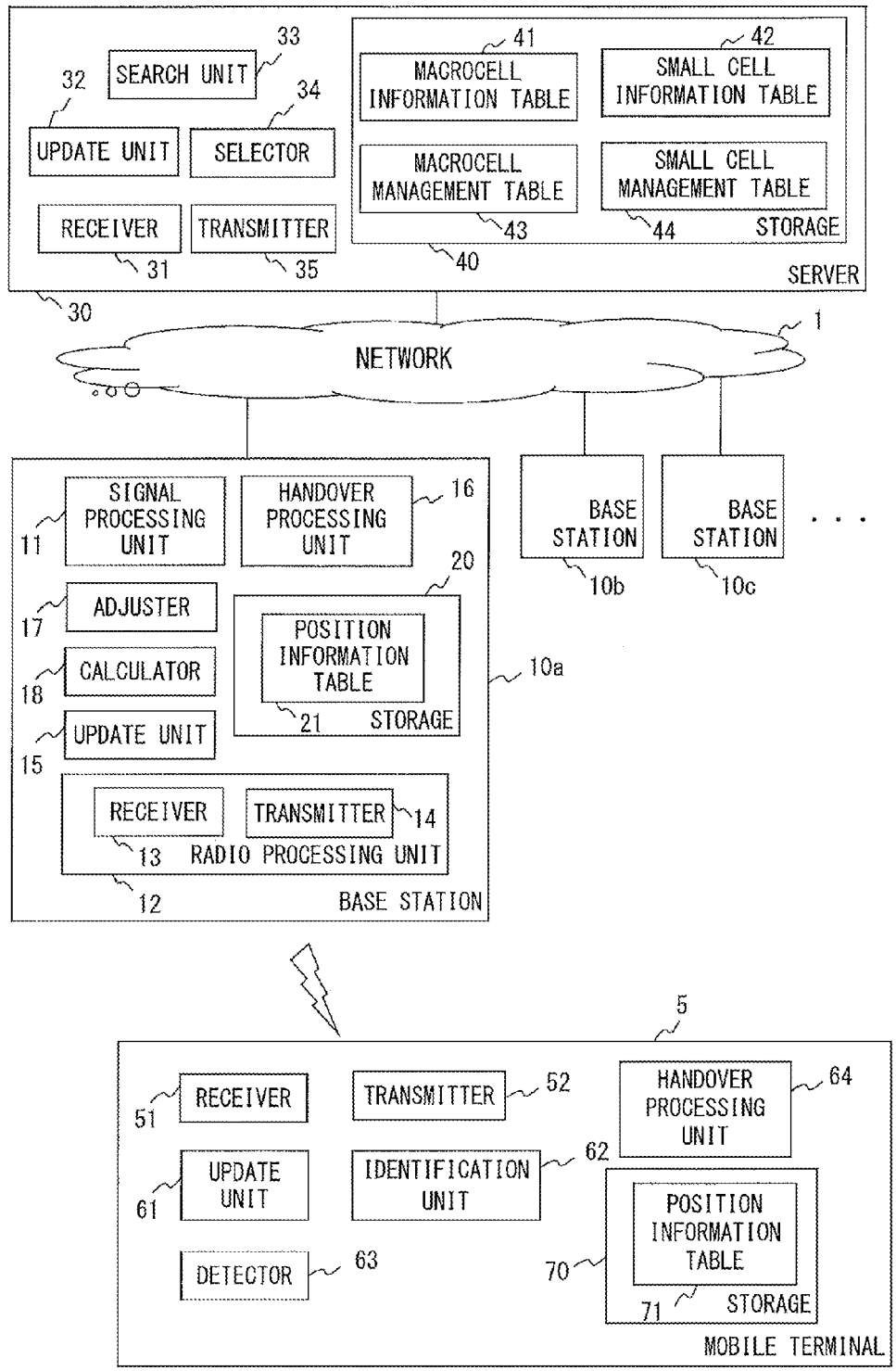
FIG. 2 illustrates an example of a configuration of the mobile terminal and the base station.

FIG. 2 illustrates an example of a configuration of the mobile terminal 5 and a base station 10 (10a to 10c). The base stations 10a to 10c is able to access a server 30 through a network 1.

The base station 10 has a signal processing unit 11, a radio processing unit 12, an update unit 15, a handover processing unit 16, an adjuster 17, and a storage 20. The radio processing unit 12 has a receiver 13 and a transmitter 14. The storage 20 holds a position information table 21. The configuration of a base station 10 that forms a macrocell is similar to the configuration of a base station 10 that forms a small cell.

The signal processing unit 11 processes a signal used for communication performed through the network 1. The receiver 13 receives information transmitted from the mobile terminal 5. The transmitter 14 transmits information such as position information to the mobile terminal 5. The position information table 21 includes position information on a small cell that can be a move destination for the mobile terminal 5 that is in communication with the base station 10. When the position information on a small cell is updated, the update unit 15 updates the position information table 21. Here, the update unit 15 obtains, for example, the position information on a small cell from the server 30 through the signal processing unit 11. The handover processing unit 16 performs processing for the mobile terminal 5 in communication starting communication with a different base station 10. The handover processing unit 16 also performs processing for starting communication with a mobile station 5 which communicates with a different base station 10. The adjuster 17 generates a message that reports, to the mobile station 5, the information on a small cell that can be a move destination for the mobile station 5. The adjuster 17 outputs the generated message to the transmitter 14. Further, the adjuster 17 is able to adjust a timing to transmit the message including the position information. The operation of the adjuster 17 will be described below. The base station 10 may further include a calculator 18. The calculator 18 is able to calculate a moving speed of the mobile station 5 and to output, to the adjuster 17, a calculation result in association with an identifier of the mobile station 5.

The mobile station 5 includes a receiver 51, a transmitter 52, an update unit 61, an identification unit 62, a detector 63, a handover processing unit 64, and a storage 70. The receiver 51 receives information such as position information from the base station 10. The transmitter 52 transmits information to the base station 10. The update unit 61 updates a position information table 71 using the position information received from the base station 10. The identification unit 62 identifies a position of the mobile station 5. For example, the identification unit 62 is able to identify the position of the mobile terminal 5 using, for example, the GPS (global positioning system).

The detector 63 detects that the mobile terminal 5 has approached a small cell that can be a move destination, by comparing the information obtained in the identification unit 62 with the position information in the position information table 71. The detector 63 has stored therein a threshold Thd in advance. For example, when a distance from the position of the mobile station 5 to the base station 10 of the small cell is not greater than the threshold Thd, the detector 63 is able to determine that it has approached the small cell. Further, if a cell radius is included in the position information table 71, the detector 63 may determine that the mobile terminal 5 has approached the small cell when a distance from the position of the mobile terminal 5 to the boundary of the small cell is not greater than the threshold Thd. The detector 63 generates a message (report information) for reporting, to the base station 10 that is a handover source, that the mobile terminal 5 has approached the small cell, and transmits the message through the transmitter 52. The handover processing unit 64 performs processing related to a handover. The storage 70 holds the position information table 71.

The server 30 includes a receiver 31, an update unit 32, a search unit 33, a selector 34, a transmitter 35, and a storage 40. The storage 40 holds a macrocell information table 41, a small cell information table 42, a macrocell management table 43, and a small cell management table 44. The receiver 31 receives information on a macrocell or information on a small cell. The receiver 31 may obtain, from each base station 10, position information on the base station 10 and information on a frequency bandwidth used for communication in the base station 10. Further, the receiver 31 may obtain information on each base station 10 through the network 1 from a device that holds in advance information on, for example, an establishment position of a base station 10.

The update unit 32 updates the macrocell information table 41 and the small cell information table 42 using the information obtained through the receiver 31. The macrocell information table 41 holds, for example, information on a position of a base station that forms a macrocell and information on a frequency bandwidth used for communication in the macrocell. The small cell information table 42 holds the information on a position of a base station that forms a small cell and on a frequency bandwidth used for communication in the small cell. Examples of the macrocell information table 41 and the small cell information table 42 will be described below.

The search unit 33 updates the macrocell management table 43 and the small cell management table 44 using the updated macrocell information table 41 and the updated small cell information table 42. For each macrocell, the search unit 33 searches for a small cell that can be a move destination for the mobile terminal 5, using information on a position of a macrocell, a cell radius of a macrocell, a position of a small cell, and a cell radius of a small cell. The search unit 33 records, in the macrocell management table 43, an obtained result in association with a physical cell ID of the macrocell. Likewise, for each small cell, the search unit 33 searches for a small cell which the mobile terminal 5 that is in communication using the small cell is able to select as a move destination. Further, the search unit 33 records, in the small cell management table 44, a search result for each small cell in association with a physical cell ID of the small cell. Examples of the macrocell management table 43 and the small cell management table 44 and a specific example of processing performed by the search unit 33, too, will be described below.

The selector 34 generates move-destination-cell information for reporting position information to the base station 10. It is assumed that "move-destination-cell information" includes position information on a cell that can be a move destination for the mobile terminal 5 that is in communication with the base station 10 that receives the move-destination-cell information. The selector 34 selects information to be transmitted according to the base station 10 that is a transmission destination. For example, when the destination to which the information is to be transmitted is a base station 10 of a macrocell, the selector 34 selects a small cell that is associated with an identifier of the macrocell formed by the base station 10 that is a transmission destination, using the macrocell management table 43. On the other hand, when a base station 10 of a small cell is a transmission destination, the selector 34 selects a small cell that is associated with an identifier of the base station 10 that is a transmission destination, using the small cell management table 44. Further, the selector 34 obtains the information on the selected small cell from the small cell information table 42 and generates move-destination-cell information to be transmitted to the base station 10. The selector 34 outputs, to the transmitter 35, the move-destination-cell information along with information that identifies the base station 10 that is a transmission destination. The transmitter 35 transmits the move-destination-cell information to the base station 10.

Figure 3:
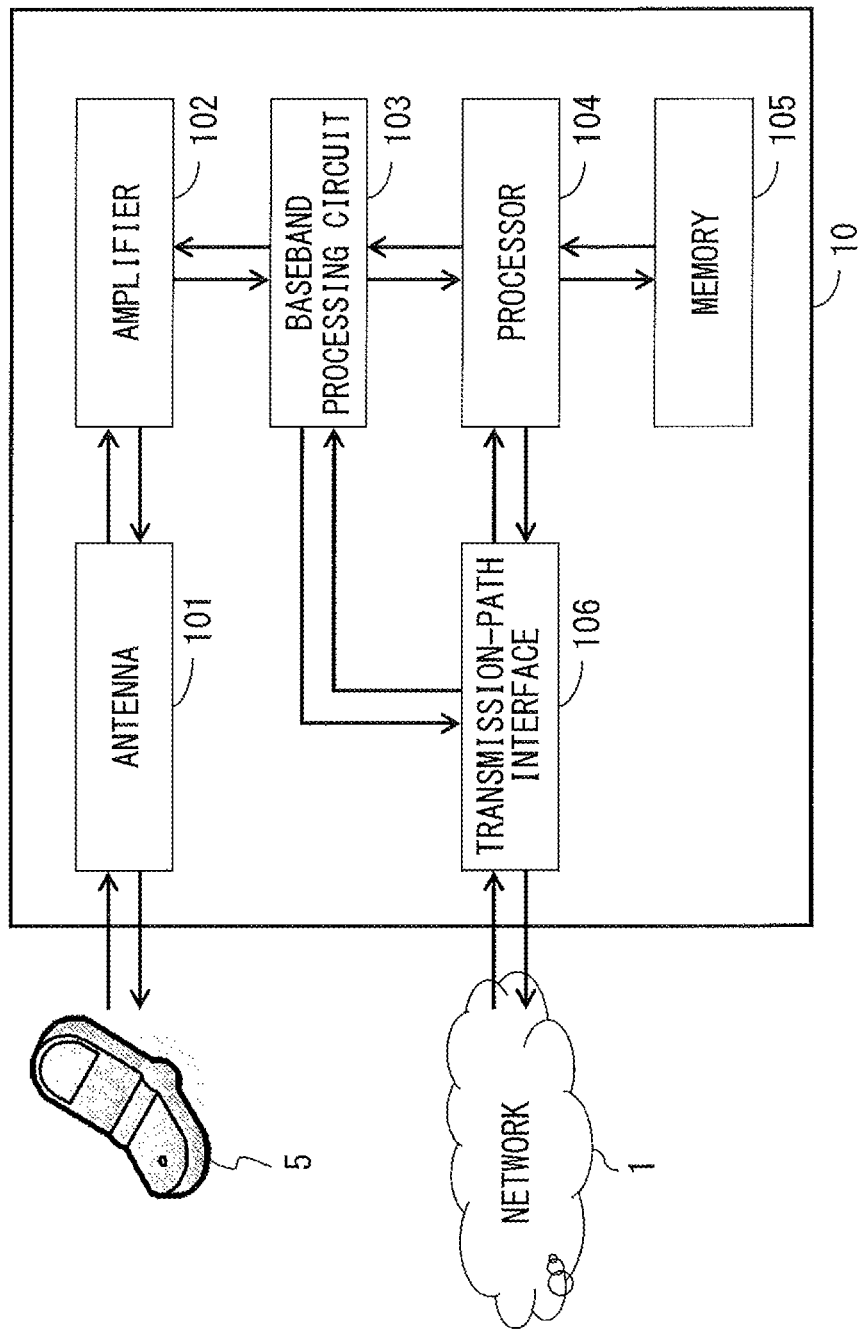
FIG. 3 illustrates an example of a hardware configuration of the base station.

FIG. 3 illustrates an example of a hardware configuration of the base station 10. The base station 10 includes an antenna 101, an amplifier 102, a baseband processing circuit 103, a processor 104, a memory 105, and a transmission-path interface 106. The base station 10 communicates with the mobile terminal 5 through the antenna 101. The antenna 101 and the amplifier 102 operate as the radio processing unit 12. The baseband processing circuit 103 processes a baseband signal. The processor 104 can be any processing circuit including a central processing unit (CPU). The processor 104 operates as the update unit 15, the handover processing unit 16, the adjuster 17, and the calculator 18 by executing a program stored in the memory 105. The memory 105 operates as the storage 20, and appropriately stores therein, for example, data or a program that are used for processing performed by the base station 10. The transmission-path interface 106 realizes the signal processing unit 11. The base station 10 performs communication with the network 1 through the transmission-path interface 106 or communication through an inter-base-station line.

Figure 4:
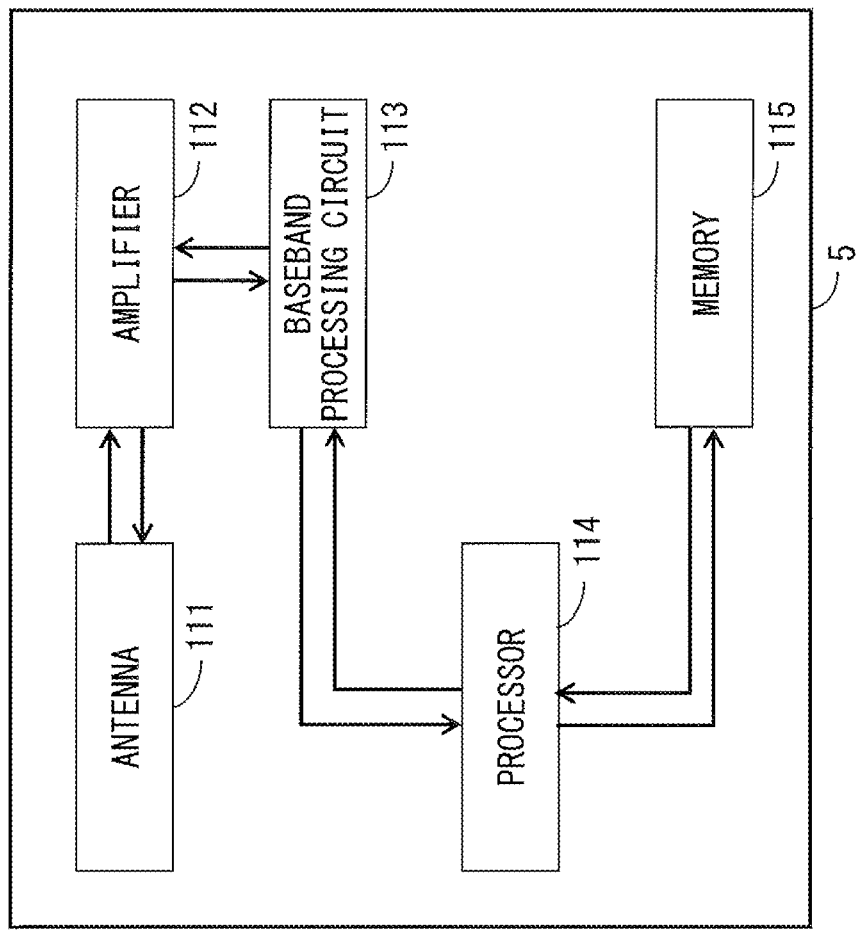
FIG. 4 illustrates an example of a hardware configuration of the mobile terminal.

FIG. 4 illustrates an example of a hardware configuration of the mobile terminal 5. The mobile terminal 5 includes an antenna 111, an amplifier 112, a baseband processing circuit 113, a processor 114, and a memory 115. The mobile terminal 5 communicates with the base station 10 through the antenna 111. The antenna 111 and the amplifier 112 operate as the receiver 51 and the transmitter 52. The baseband processing circuit 113 processes a baseband signal. The processor 114 is any processing circuit including a CPU. The processor 114 operates as the update unit 61, the identification unit 62, the detector 63, and the handover processing unit 64 by executing a program stored in the memory 115. The memory 115 operates as the storage 70, and appropriately stores therein, for example, data or a program that are used for processing performed by the mobile terminal 5.

Figure 5:
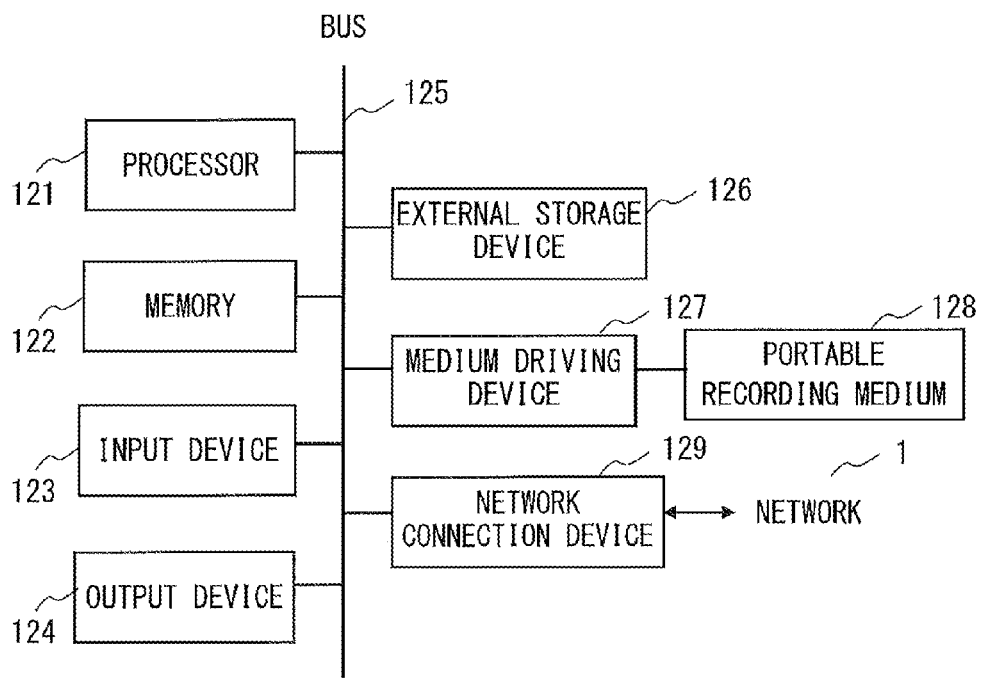
FIG. 5 illustrates an example of a hardware configuration of a server.

FIG. 5 illustrates an example of a hardware configuration of the server 30. The server 30 includes a processor 121, a memory 122, a bus 125, an external storage device 126, and a network connection device 129. The server 30 may further include an input device 123, an output device 124, and a medium driving device 127.

The processor 121 is any processing circuit including a CPU. The processor 121 operates as the update unit 32, the search unit 33, and the selector 34. The processor 121 is able to execute, for example, a program stored in the external storage device 126. The memory 122 operates as the storage 40. Further, the memory 122 appropriately stores therein data obtained by the operation of the processor 121 or data used for processing performed by the processor 121. The network connection device 129 is used for communication with another device, and operates as the receiver 31 and the transmitter 35.

The input device 123 is realized as, for example, a button, a keyboard, or a mouse, and the output device 124 is realized as, for example, a display. The bus 125 connects the processor 121, the memory 122, the input device 123, the output device 124, the external storage device 126, the medium driving device 127, and the network connection device 129 so that they are able to perform data passing between one another. The external storage device 126 stores therein a program or data and appropriately provides the stored information to, for example, the processor 121. The medium driving device 127 is able to output data in the memory 122 or data in the external storage device 126 to a portable recording medium 128, and to read the program or the data from the portable recording medium 128. In this case, the portable recording medium 128 can be any portable recording medium that includes a floppy disk, a magneto-optical (MO) disk, a compact disc recordable (CD-R), and a digital versatile disk recordable (DVD-R).

<First Embodiment>

Figure 6:
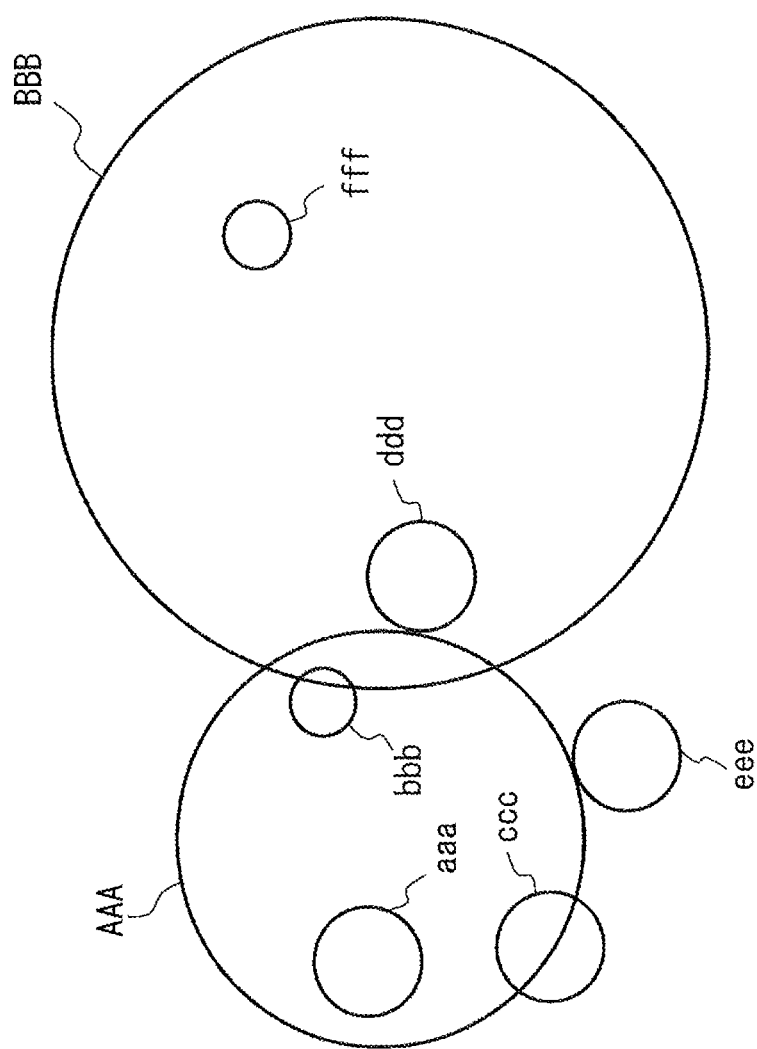
FIG. 6 illustrates an example of arrangement of a macrocell and a small cell.

FIG. 6 illustrates an example of arrangement of a macrocell and a small cell. An identifier of a macrocell is hereinafter indicated by a string of three upper case letters of the alphabet, and an identifier of a small cell is hereinafter indicated by a string of three lower case letters of the alphabet. For example, in FIG. 6, a cell AAA and a cell BBB are a macrocell, and a cell aaa and a cell bbb are a small cell. In order to facilitate understanding, a physical cell ID and an identifier of each cell are represented by an identical string. For example, a physical cell ID of the cell AAA is AAA. In the example of FIG. 6, the macrocell AAA includes the small cell aaa and the small cell bbb, and shares a certain area with a small cell ccc. Further, the macrocell AAA can be thought to share at least one point with a small cell ddd and a small cell eee because the macrocell AAA is in contact with the small cell ddd and the small cell eee. On the other hand, the macrocell BBB includes the small cell ddd and the small cell fff, and shares a certain area with the small cell bbb.

A communication method according to a first embodiment will now be described with reference to an example of a case in which a macrocell and a small cell are arranged as illustrated in FIG. 6. The method will be described, divided into a method for identifying a cell that can be a move destination for the mobile terminal 5, a report of position information to the base station 10, a report of position information from the base station 10 to the mobile terminal 5, and processing performed by the mobile terminal 5.

[Method for Identifying Cell that can be Move Destination for Mobile Terminal]

FIG. 7 illustrates examples of the macrocell information table 41 and the small cell information table 42. In the example of FIG. 7, an establishment position of a base station that forms a cell, a frequency bandwidth used for communication, and a cell radius are recorded in association with a physical cell ID allocated to each cell, both in the macrocell information table 41 and in the small cell information table 42. In the example of FIG. 7, position information is a combination of longitude and latitude, and a value including xx at its end is latitude (north latitude) and a value including yy at its end is longitude (east longitude). In the following description, the macrocell AAA and the macrocell BBB use the same frequency bandwidth. On the other hand, all of the small cells aaa to fff use, for communication, bandwidths different from that of the macrocell AAA or the macrocell BBB. Further, between the small cells, bandwidths used for communication maybe be the same or maybe different from one another. In the example of FIG. 7, both the macrocell AAA and the macrocell BBB perform communication in a bandwidth of 2.2 GHz. On the other hand, the small cells aaa, ccc, ddd, and eee use a frequency bandwidth of 800 MHz, but the small cells bbb and fff use a frequency bandwidth of 900 MHz.

Figure 8:
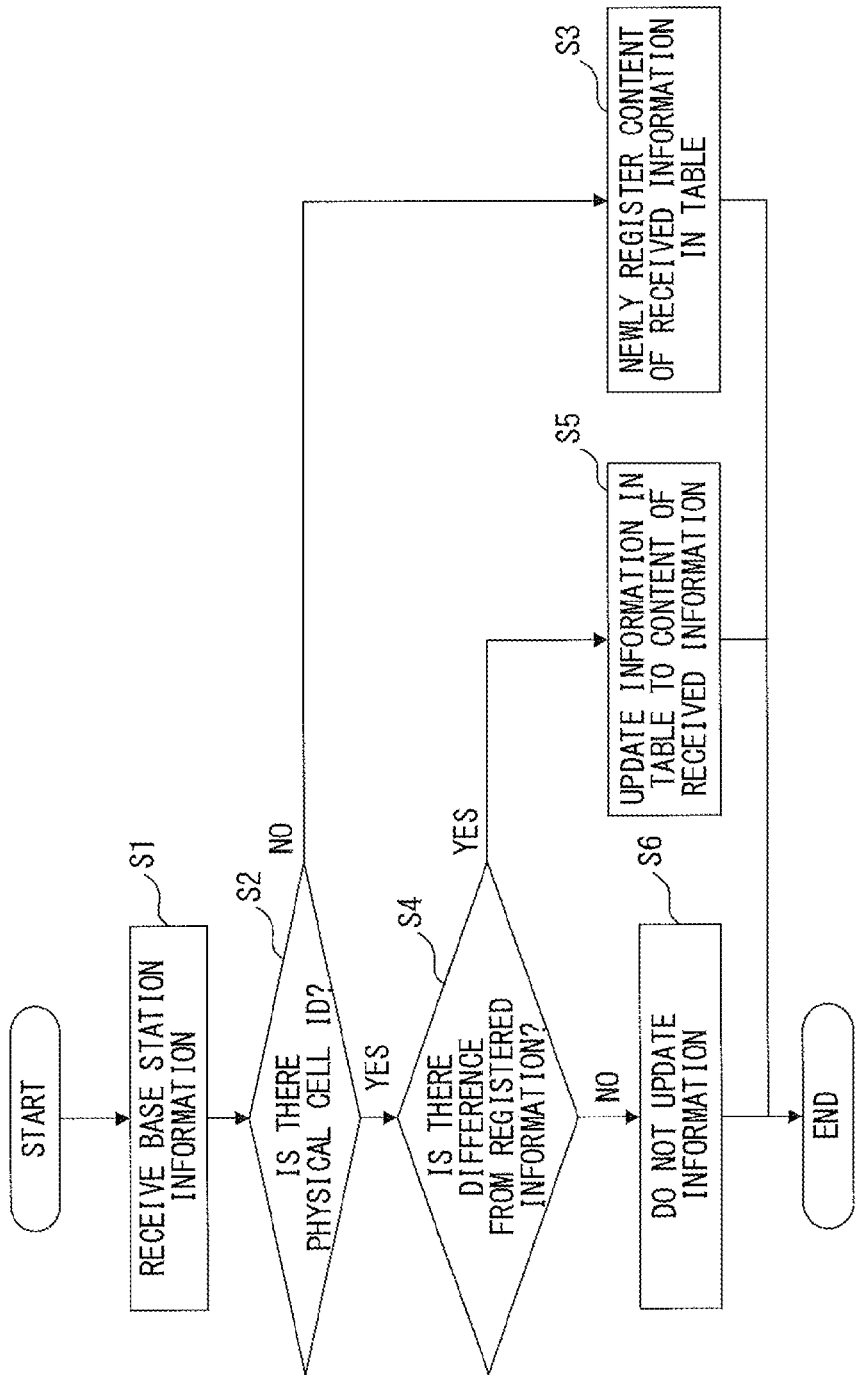
FIG. 8 is a flowchart that illustrates an example of processing performed by an update unit.

FIG. 8 is a flowchart that illustrates an example of processing performed by the update unit 32. The macrocell information table 41 and the small cell information table 42 are updated in the procedure illustrated in FIG. 8. First, the receiver 31 of the server 30 obtains information such as position information on the base station 10 and information on a cell radius in association with a physical cell ID. These pieces of information are obtained from a device that holds information on, for example, a position of the base station 10 or from the base station 10.

The receiver 31 outputs the obtained information to the update unit 32 (Step S1). The update unit 32 identifies whether the information input from the receiver 31 is information on a macrocell or a small cell. Any method for identifying the size of a cell may be used. For example, the update unit 32 may have stored therein in advance a physical cell ID allocated to a macrocell. Further, for example, the update unit 32 may identify whether the input information is information on a macrocell or a small cell, using a cell radius or a value of transmission power. When determining that the input information is information on a macrocell, the update unit 32 searches in the macrocell information table 41 using, as a key, a physical cell ID associated with the reported information.

When the physical cell ID used as a key is not included in the macrocell information table 41, the update unit 32 creates a new entry in the macrocell information table 41, and registers the input information in the macrocell information table 41 (No in Step S2, Step S3). On the other hand, when the physical cell ID used as a key is included in the macrocell information table 41, the update unit 32 determines whether there is a difference between the information recorded in the macrocell information table 41 and the information input from the receiver 31 (Yes in Step S2, Step S4). When the update unit 32 has determined that there is a difference between the two pieces of information, the update unit 32 updates the macrocell information table 41 using the information reported from the receiver (Yes in Step S4, Step S5). On the other hand, when there is no difference between the information in the macrocell information table 41 and the information input from the receiver 31 with respect to the information associated with the physical cell ID used as a key, the update unit 32 ends the processing (No in Step S4, Step S6). If the processing that has been described with reference to FIG. 8 is performed, the macrocell information table 41 of FIG. 7 is obtained when macrocells are arranged as illustrated in FIG. 6.

The update unit 32 also performs processing similar to the processing that has been described by use of FIG. 8 on the information determined to be information on a small cell. If the processing that has been described with reference to FIG. 8 is performed, the small cell information table 42 of FIG. 7 is obtained when small cells are arranged as illustrated in FIG. 6. When a macrocell or a small cell has been newly established, or when the establishment position has been changed, the macrocell information table 41 and/or the small cell information table 42 are updated according to the change in a status of an establishment of a cell, by performing the processing illustrated in FIG. 8.

Figure 9:
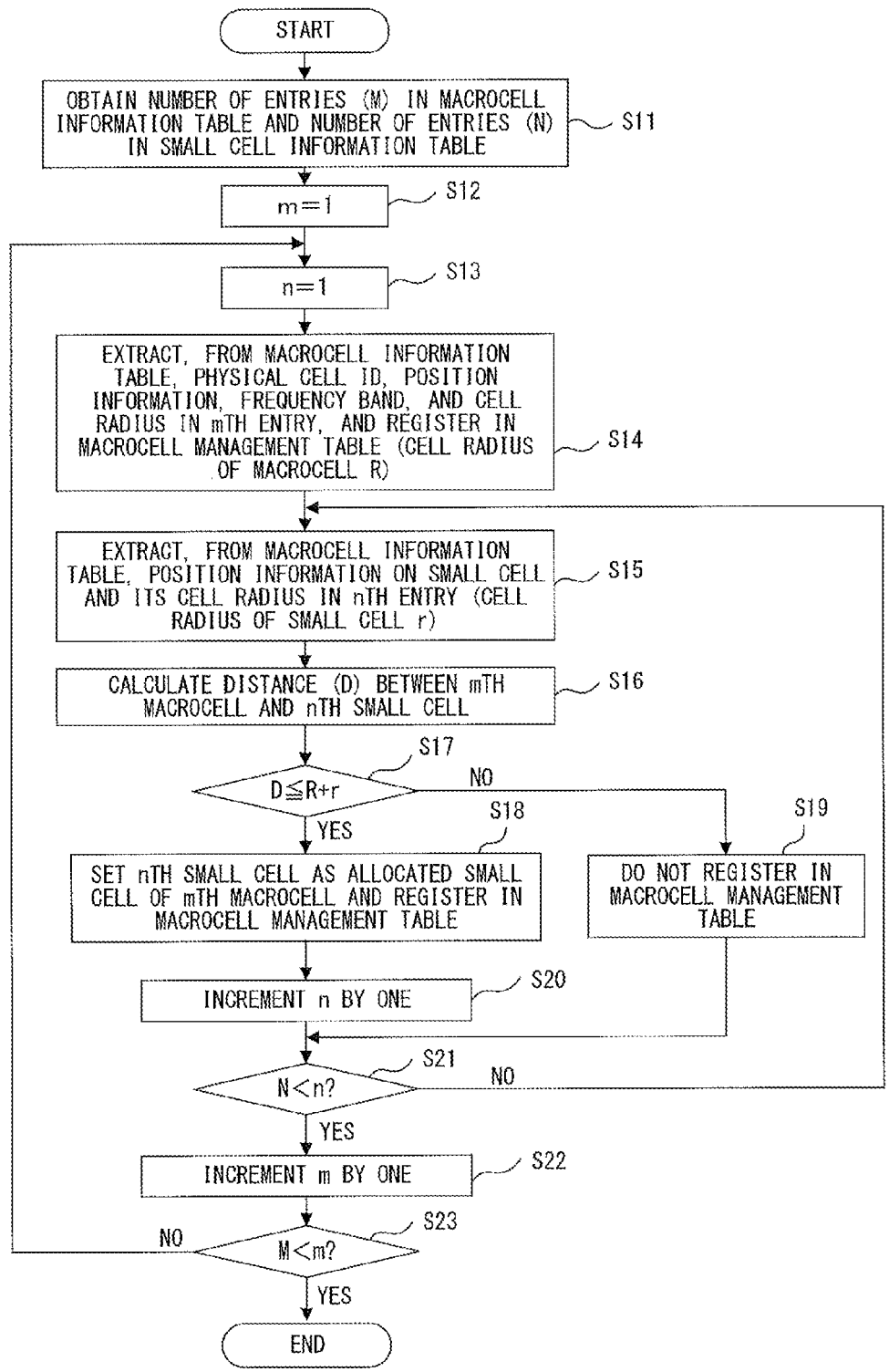
FIG. 9 is a flowchart that illustrates an example of a method for updating a macrocell management table.

FIG. 9 is a flowchart that illustrates an example of a method for updating the macrocell management table 43. FIG. 10 illustrates examples of the macrocell management table 43. When the macrocell information table 41 and the small cell information table 42 are updated, the search unit 33 searches, for each macrocell, for a small cell that can be a move destination for the mobile terminal 5, and records an obtained result in the macrocell management table 43. An example of processing performed by the search unit 33 when the macrocell management table 43 illustrated in FIG. 10 is generated will now be described with reference to FIG. 9. In the example below, a small cell that can be a move destination for the mobile terminal 5 may be referred to as "allocated small cell". The allocated small cell can also be a small cell that is allocated to each base station 10 and whose position information is to be reported to the mobile terminal 5 that is in communication with the base station 10. In the example of FIG. 9, the order of Step S11 and Step S12 may be changed according to the implementation.

The search unit 33 obtains the number of entries (N) included in the macrocell information table 41 and the number of entries (N) included in the small cell information table 42 (Step S11). A constant M is the total number of macrocells, and a constant N is the total number of small cells. Next, the search unit 33 sets variables m and n to one (Steps S12, S13). m is a variable that identifies an entry in the macrocell information table 41, and n is a variable that identifies an entry in the small cell information table 42.

The search unit 33 obtains information on a macrocell recorded in an mth entry from the macrocell information table 41, and records the information in the macrocell management table 43 (Step S14). It is assumed that a physical cell ID, position information, a frequency bandwidth, and a cell radius are recorded in each entry. The cell radius of an mth macrocell is R. For example, with respect to the cell AAA, the search unit 33 obtains the following information from the first entry in the macrocell information table 41 of FIG. 7.

Physical cell ID: AAA
Positional information: Latitude of 35.730541 degrees north, longitude of 139.71294 degrees east
Frequency bandwidth: 2.2 GHz
Cell radius: 500 m The search unit 33 generates a macrocell management table 43a of FIG. 10 using the obtained information.

Next, the search unit 33 obtains, from the small cell information table 42, position information on a small cell recorded in an nth entry and its cell radius (Step S15). The cell radius of an nth small cell is r. For example, for a cell aaa, the search unit 33 obtains information that a position is at latitude of 35.730542 degrees north and longitude of 139.71295 degrees east and a cell radius r=10 m. The search unit 33 calculates a distance (D) between the mth macrocell and the nth small cell using the position information on the mth macrocell and the position information on the nth small cell (Step S16). The calculation of distance performed by the search unit 33 may be any calculation method by use of information on longitude and latitude of two points. The distance D calculated in the sample of FIG. 9 is a distance between the base station of the mth macrocell and the base station of the nth small cell.

The search unit 33 compares the distance D with a total amount of the cell radius of the mth macrocell and the cell radius of the nth small cell (Step S17). When the distance D is not greater than the total amount, the mth macrocell and the nth small cell share at least one point with each other. For example, the distance D and the total amount are equal, the mth macrocell and the nth small cell are in contact with each other. Further, when the distance D is less than the total amount, there is an area in which the mth macrocell and the nth small cell overlap. Then, when the distance D is not greater than the total amount, the search unit 33 determines that the nth small cell can be a move destination from the mth macrocell, and records in the macrocell management table 43 (Yes in Step S17, Step S18). For example, as illustrated in FIG. 6, the distance between the macrocell AAA and the small cell aaa is smaller than the total amount of the cell radius of the macrocell AAA and the cell radius of the small cell aaa. Then, the search unit 33 sets the small cell aaa as an allocated small cell of the macrocell AAA and updates the macrocell management table 43a to a macrocell management table 43b (FIG. 10). On the other hand, when the distance D is greater than the total amount, the search unit 33 determines that the nth small cell is not a move destination from the mth macrocell, and does not record in the macrocell management table 43 (No in Step S17, Step S19).

When the process of Step S18 or Step S19 is completed, the search unit 33 compares the variable n with the total number of small cells N after the search unit 33 increments the variable n by one (Steps S20, S21). When the variable n is not greater than the total number of small cells N, the processes of and after Step S15 are repeated (No in Step S21). In other words, it is determined whether each small cell can be a move destination cell with respect to each macrocell identified by the variable m.

When the variable n exceeds the total number of small cells N, the search unit 33 compares the variable m with the total number of macrocells M after the search unit 33 increments the variable m by one (Steps S22, S23). When the variable m is not greater than the total number of macrocells M, the processes of and after Step S13 are repeated (No in Step S23). As a result, data in the macrocell management table 43 is updated with respect to all the macrocells. When the variable m exceeds the total number of macrocells M, the search unit 33 ends the processing (Yes in Step S23). Thus, if the processing that has been described with reference to FIG. 9 is performed, a macrocell management table 43c (FIG. 10) is obtained when cells are arranged as illustrated in FIG. 6.

Figure 11:
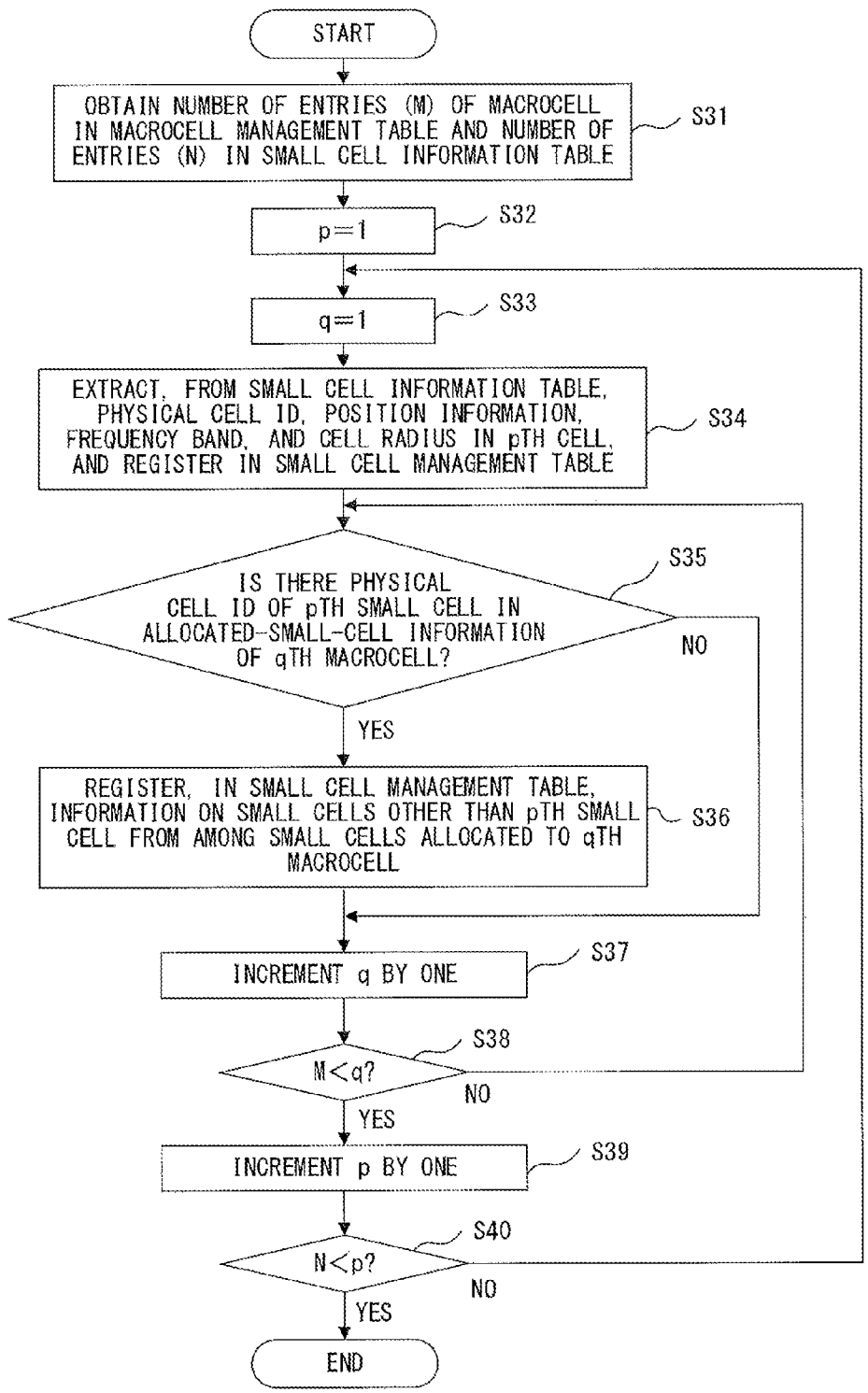
FIG. 11 is a flowchart that illustrates an example of a method for updating a small cell management table.

FIG. 11 is a flowchart that illustrates an example of a method for updating the small cell management table 44. FIG. 12 illustrates examples of the small cell management table 44. When the update of the macrocell management table 43 is completed, the search unit 33 searches, for each small cell, for a small cell that can be a move destination for the mobile terminal 5, and records an obtained result in the small cell management table 44. An example of processing performed by the search unit 33 when the small cell management table 44 illustrated in FIG. 12 is generated will now be described with reference to FIG. 11. In the example of FIG. 11, the order of Step S31 and Step S32 may be changed according to the implementation.

The search unit 33 obtains the number of entries of a macrocell (M) included in the macrocell management table 43 and the number of entries (N) included in the small cell information table 42 (Step S31). A constant M is the total number of macrocells, and a constant N is the total number of small cells. Next, the search unit 33 sets variables p and q to one (Steps S32, S33). p is a variable that identifies a small cell, and q is a variable that identifies a macrocell. The search unit 33 obtains information on a small cell recorded in the pth entry from the small cell information table 42, and records the information in the small cell management table 44 (Step S34). For example, the search unit 33 records a physical cell ID, position information, a frequency bandwidth, and a cell radius of a small cell in the small cell management table 44.

The search unit 33 refers to the entry of a qth macrocell in the macrocell management table 43, and determines whether a pth small cell is included as an allocated small cell (Step S35). When the pth small cell is included, from among the allocated small cells of the qth macrocell, the small cells other than the pth small cell are determined to be an allocated small cell of the pth small cell (Yes in Step S35, Step S36). For example, when searching for an allocated small cell of the small cell aaa, the search unit 33 identifies an allocated small cell of the macrocell AAA using the macrocell management table 43c (FIG. 10). In this case, allocated small cells of the macrocell AAA are the cell aaa, the cell bbb, the cell ccc, the cell ddd, and the cell eee. The search unit 33 determines that the cells other than the small cell aaa are an allocated small cell of the small cell aaa because the allocated small cells of the macrocell AAA include the small cell aaa. Thus, as illustrated in a small cell management table 44a (FIG. 12), the search unit 33 records that allocated small cells of the cell aaa are the cell bbb, the cell ccc, the cell ddd, and the cell eee.

When the process of Step S36 is completed, the search unit 33 compares the variable q with the total number of macrocells N after the search unit 33 increments the variable q by one (Steps S37, S38). When the variable q is not greater than the total number of macrocells M, the processes of and after Step S35 are repeated (No in Step S38). Thus, when identifying an allocated small cell with respect to one small cell, information on the allocated small cells of all the macrocells is used. Therefore, when a certain small cell is an allocated small cell of a plurality of macrocells, an allocated small cell of the small cell is identified by use of the information on the plurality of macrocells. For example, the small cell bbb is an allocated small cell of the macrocell AAA, and is also an allocated small cell of the macrocell BBB. Thus, from among the allocated small cells of the macrocell AAA, the cell aaa, the cell ccc, the cell ddd, and the cell eee are an allocated small cell of the cell bbb. Further, the cell bbb, the cell ddd, and the cell fff are an allocated small cell of the macrocell BBB, so the cell fff is also an allocated small cell of the cell bbb.

When the variable q exceeds the total number of macrocells M, the search unit 33 compares the variable p with the total number of small cells N after the search unit 33 increments the variable p by one (Steps S39, S40). When the variable p is not greater than the total number of small cells N, the processes of and after Step S33 are repeated (No in Step S40). As a result, data in the small cell management table 44 is updated with respect to all the small cells. When the variable p exceeds the total number of small cells N, the search unit 33 ends the processing (Yes in Step S40). Thus, if the processing that has been described with reference to FIG. 11 is performed, a small cell management table 44*b* illustrated in FIG. 12 is obtained when cells are arranged as illustrated in FIG. 6.

Figure 13:
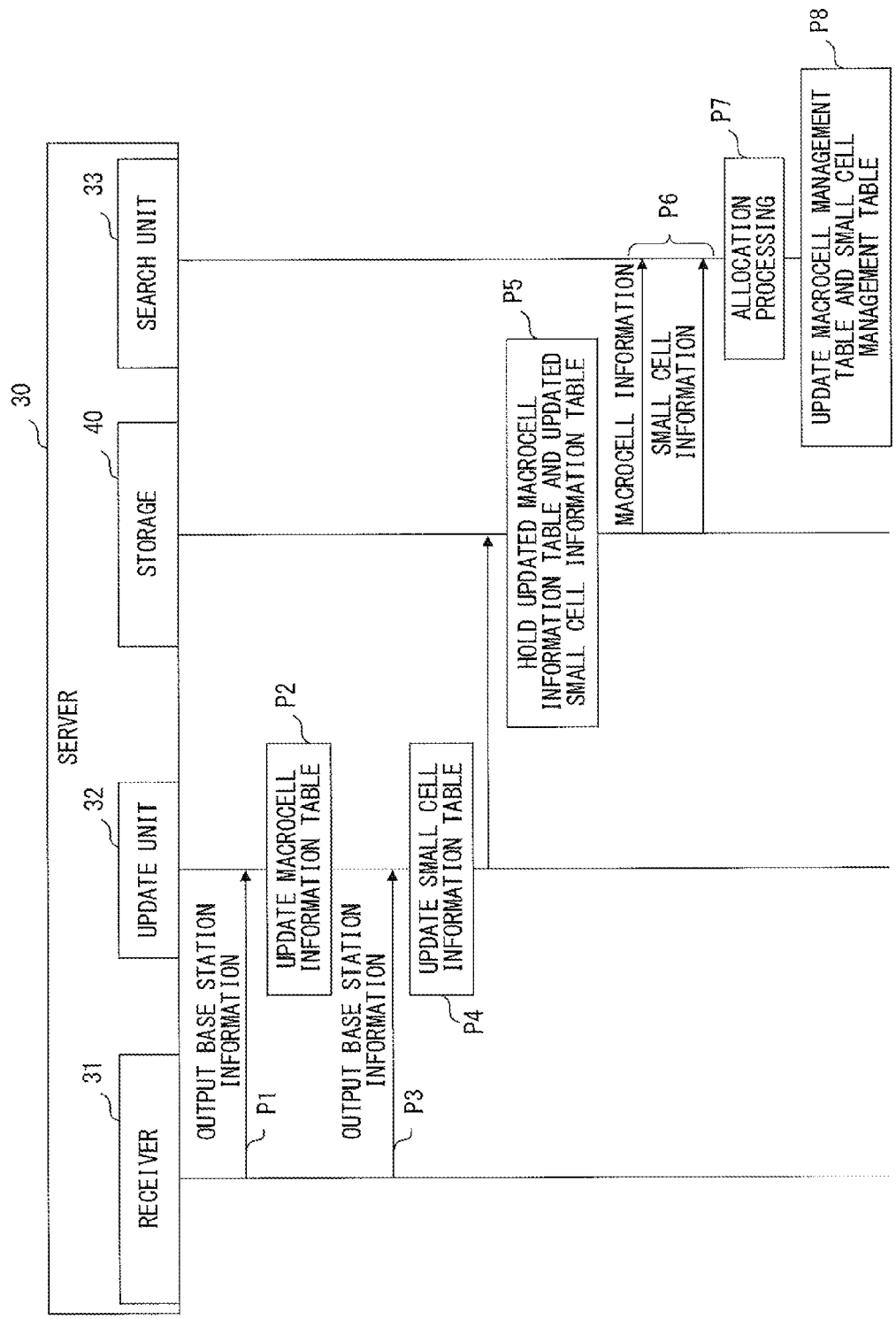
FIG. 13 is a sequence diagram that illustrates an example of a method for identifying a cell that can be a move destination for the mobile terminal.

FIG. 13 is a sequence diagram that illustrates an example of a method for identifying a cell that can be a move destination for a mobile terminal. This processing is performed by, for example, the server 30. A set of arrows illustrated in FIG. 13 represents an example of a flow of information. FIG. 13 is just an example, and the order of operation may be changed according to the implementation. For example, Procedures P3 and P4 may be performed before Procedures P1 and P2.

The procedure P1 is performed as follows. When receiving information on a base station 10, the receiver 31 outputs the received information to the update unit 32.

The procedure P2 is performed as follows. The update unit 32 determines whether the information input from the receiver 31 is information on a base station 10 of a macrocell or a small cell. In this case, the information on a base station of a macrocell has been input. Then, the update unit 32 updates the macrocell information table 41.

The procedure P3 is performed as follows. As is the case in Procedure P1, the information is output to the update unit 32.

The procedure P4 is performed as follows. The update unit 32 performs a determination similar to that in Procedure P2. In this case, the information on a base station of a small cell has been input. Then, the update unit 32 updates the small cell information table 42.

The procedure P5 is performed as follows. The storage 40 holds the updated macrocell information table 41 and the updated small cell information table 42.

The procedure P6 is performed as follows. The search unit 33 accesses the storage 40 so as to obtain the macrocell information table 41 and the small cell information table 42.

The procedure P7 is performed as follows. The search unit 33 identifies a small cell that can be a move destination from each cell using the macrocell information table 41 and the small cell information table 42.

The procedure P8 is performed as follows. The search unit 33 updates the macrocell management table 43 and the small cell management table 44. In this case, the search unit 33 records, in the macrocell management table 43 and the small cell management table 44, as an allocated small cell, a small cell that can be a move destination from each cell.

[Report of Position Information to Base Station 10]

When the processing of updating the macrocell management table 43 and the small cell management table 44 is completed, the server 30 reports move-destination-cell information to a base station 10. In this case, "move-destination-cell information" includes position information on a cell that can be a move destination for the mobile terminal 5 that is in communication with the base station 10 to which the move-destination-cell information is to be transmitted. In the move-destination-cell information, any information including position information on each cell is associated with a physical cell ID of an allocated small cell of the base station 10 to which the move-destination-cell information is to be transmitted. In the following description, in order to easily distinguish the destination to which the move-destination-cell information is to be transmitted, a first letter of an ID of a physical cell formed by a base station 10 in operation may be placed after a numerical reference for the base station. For example, a base station 10A forms a macrocell AAA, and a base station 10*b* forms a small cell bbb. Further, a position information table 21A is a position information table 21 held by the base station 10A.

First, a method for generating move-destination-cell information to be transmitted to a base station 10 of a macrocell will be described. The selector 34 identifies, from the macrocell management table 43, an allocated small cell with respect to a base station 10 to which move-destination-cell information is to be transmitted. Further, the selector 34 selects position information on, for example, the identified allocated small cell from the small cell management table 44. The selector 34 may obtain position information on an allocated small cell from the small cell information table 42.

For example, when generating move-destination-cell information to be transmitted to a base station 10A of a macrocell AAA, the selector 34 identifies an allocated small cell associated with the cell AAA from the macrocell management table 43*c* (FIG. 10). The allocated small cells associated with the cell AAA are the cell aaa, the cell bbb, the cell ccc, the cell ddd, and the cell eee. The selector 34 generates move-destination-cell information by obtaining, for example, position information with respect to each of the identified cells from the small cell management table 44. FIG. 14 illustrates an example of move-destination-cell information to be transmitted to the base station 10A of the macrocell AAA. Also, for a base station 10B of a macrocell BBB, move-destination-cell information is generated by performing similar processing.

Next, a method for generating move-destination-cell information to be transmitted to a base station 10 of a small cell will be described. The selector 34 identifies, from the small cell management table 44, an allocated small cell with respect to a base station 10 to which move-destination-cell information is to be transmitted. Further, the selector 34 also selects, from among the entries in the small cell management table 44, for example, position information on the identified allocated small cell. Also when generating move-destination-cell information to be transmitted to a base station 10 of a small cell, the selector 34 may obtain position information on an allocated small cell from the small cell information table 42.

For example, when generating move-destination-cell information to be transmitted to a base station 10*d* of a small cell ddd, the selector 34 identifies an allocated small cell associated with the cell ddd from the small cell management table 44*b* (FIG. 12). The allocated small cells associated with the cell ddd are the cell aaa, the cell bbb, the cell ccc, the cell eee, and the cell fff. The selector 34 generates move-destination-cell information by obtaining, for example, position information with respect to each of the identified cells from the small cell management table 44. Also, with respect to base stations 10 of other small cells, the selector 34 generates move-destination-cell information by performing similar processing.

Figure 15:
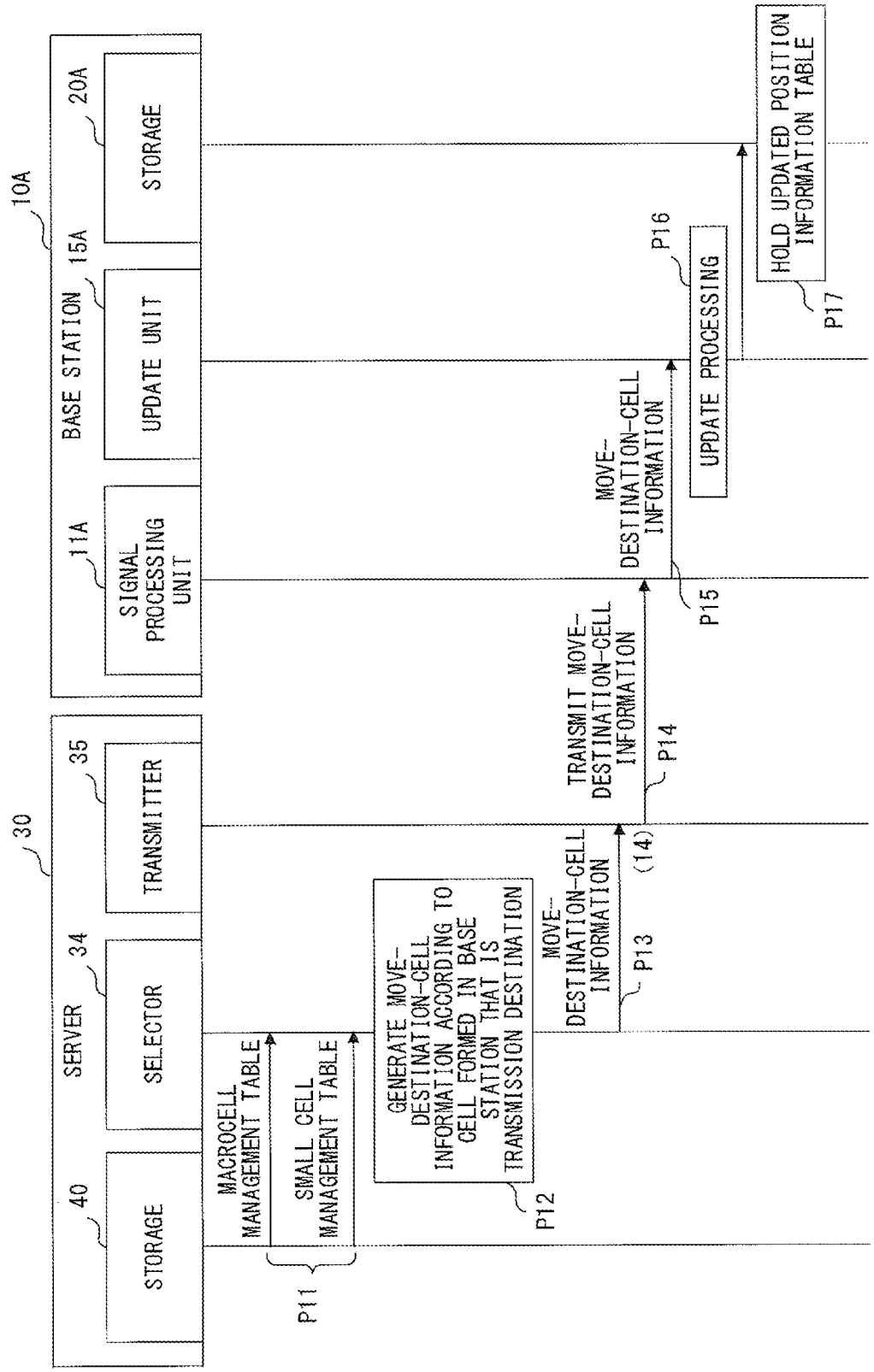
FIG. 15 is a sequence diagram that illustrates an example of processing of reporting move-destination-cell information to the base station.

FIG. 15 is a sequence diagram that illustrates an example of processing of reporting move-destination-cell information to the base station 10. FIG. 15 illustrates an example of communication processing when the server 30 reports move-destination-cell information to the base station 10A that forms the macrocell AAA, and similar processing applies to communication between the server 30 and a base station 10 of a different macrocell.

The procedure P11 is performed as follows. The selector 34 obtains, from the storage 40, information in the macrocell management table 43 and the small cell management table 44.

The procedure P12 is performed as follows. The selector 34 searches in the macrocell management table 43 using, as a key, a physical cell ID of a cell formed in the base station 10A that is a transmission destination. In this case, the physical cell ID of the cell formed in the base station 10A is AAA. The selector 34 generates move-destination-cell information to be transmitted to the base station 10A. The method for generating move-destination-cell information is as described with reference to FIG. 14.

The procedure P13 is performed as follows. The selector 34 designates the base station 10A as a destination and outputs the generated move-destination-cell information to the transmitter 35.

The procedure P14 is performed as follows. The transmitter 35 transmits the move-destination-cell information input from the selector 34 to the base station 10A.

The procedure P15 is performed as follows. A signal processing unit 11A of the base station 10A receives a signal from the server 30. The signal processing unit 11A obtains the move-destination-cell information from the received signal and outputs it to an update unit 15A.

The procedure P16 is performed as follows. The update unit 15A compares the move-destination-cell information with the position information table 21A. When there is a difference between the position information table 21A and the move-destination-cell information, the update unit 15A updates the position information table 21A according to the move-destination-cell information. In this case, the update unit 15A may only update the information on a base station in which there is a difference between the position information table 21A and the move-destination-cell information. Further, the update unit 15A may delete the information in the position information table 21A which it already holds and may replace the information included in the move-destination-cell information with the position information table 21A. FIG. 16 illustrates examples of the position information table 21A when the move-destination-cell information illustrated in FIG. 14 is transmitted to the base station 10A.

The procedure P17 is performed as follows. The update unit 15A outputs the updated position information table 21A to a storage 20A. The storage 20A holds the updated position information table 21A.

Likewise, the server 30 generates move-destination-cell information and reports the information to the base station 10B that forms the macrocell BBB in a similar way. Thus, when the server 30 holds the macrocell management table 43*c* (FIG. 10) and the small cell management table 44*b* (FIG. 12), the base station 10B holds a position information table 21B illustrated in FIG. 16.

The operations for reporting move-destination-cell information to a base station 10 of a macrocell has been described by use of FIG. 15, and processing for reporting move-destination-cell information to a base station 10 of a small cell is similar to it. However, when generating move-destination-cell information to be transmitted to the base station 10 of a small cell, the selector 34 does not access the macrocell management table 43 in Procedure P11 because the macrocell management table 43 is not used. Thus, when the server 30 holds the small cell management table 44*b* (FIG. 12), the base station 10*a* holds a position information table 21*a* of FIG. 16 if move-destination-cell information is reported. Likewise, the base station 10*b* holds a position information table 21*b* of FIG. 16.

[Report of Position Information to Mobile Terminal 5]

FIG. 17 is a sequence diagram that illustrates an example of processing performed when the base station 10 reports position information to the mobile terminal 5.

The procedure P21 is performed as follows. The handover processing unit 16 of the base station 10 performs processing for a handover of the mobile terminal 5 when the mobile terminal 5 is approaching a cell formed by the base station 10. In the following description, an entry of the mobile terminal 5 into a cell of the base station 10 is referred to as "hand-in". The handover processing unit 16 detects a hand-in when starting communicating with the mobile terminal 5. The base station 10 is able to use, for detecting a hand-in, transmission and reception of any message that are to be performed after synchronization processing is performed between the mobile terminal 5 and the base station 10 that is a handover destination. A specific example of a method for detecting a hand-in will be described below.

The procedure P22 is performed as follows. When detecting a hand-in, the handover processing unit 16 reports the occurrence of the hand-in to the adjuster 17.

The procedure P23 is performed as follows. When the hand-in is reported, the adjuster 17 obtains position information by accessing the position information table 21 in the storage 20. The adjuster 17 generates a message to be transmitted to the mobile terminal 5 using the obtained position information. In this case, the adjuster 17 is able to use, as position information, a list in which a physical cell ID is associated with position information for all small cells included in the position information table 21. Further, the adjuster 17 may also include, in the message to be transmitted to the mobile terminal 5, information on a cell radius and a frequency of each small cell along with the position information.

In the procedure P24, the adjuster 17 outputs the generated message to the transmitter 14.

The procedure P25 is performed as follows. The transmitter 14 transmits the message input from the adjuster 17 to the mobile terminal 5. The mobile terminal 5 updates the position information table 71 using the message received from the base station 10. Processing performed by the mobile terminal 5 will be described below.

Figure 18:
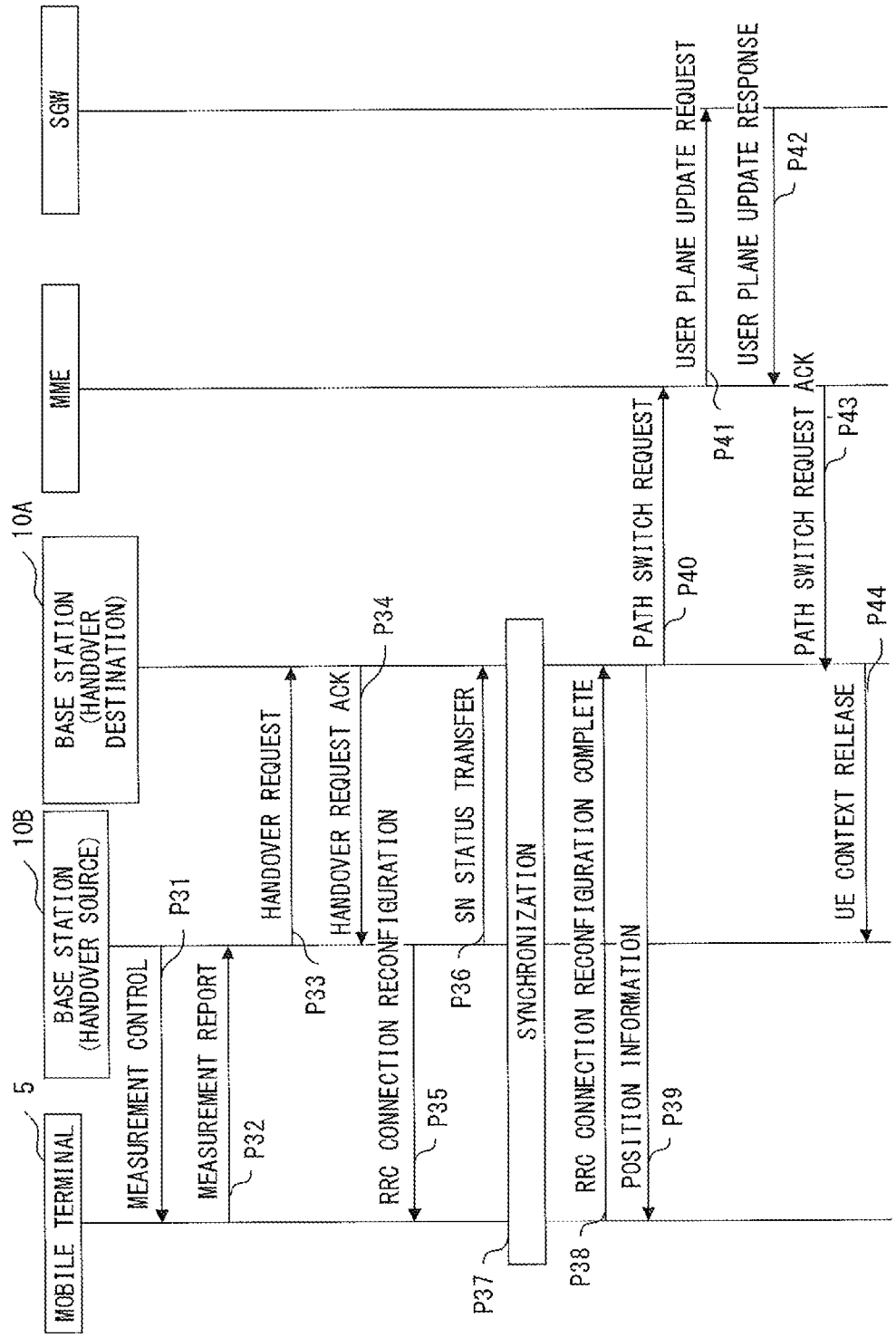
FIG. 18 is a sequence diagram that illustrates an example of a handover.

FIG. 18 is a sequence diagram that illustrates an example of a handover. An example of a method for detecting a hand-in with reference to FIG. 18. FIG. 18 illustrates an example of processing performed when the mobile terminal 5 hands over from the base station 10B to the base station 10A. In the example of FIG. 18, when receiving, from the mobile terminal 5, a request message that requests for a start of communication using the macrocell AAA formed by the base station 10A, the base station 10A that is a handover destination detects a hand-in to the macrocell AAA.

The mobile terminal 5 measures, for example, the receiving strength from a neighboring base station when receiving a Measurement Control from the base station 10B with which it is in communication (Procedure P31). The mobile terminal 5 reports an obtained result to the base station 10B using a Measurement Report (Procedure P32). Using the Measurement Report, the base station 10B determines that the mobile terminal 5 performs a handover from the base station 10B to the base station 10A, and transmits a Handover Request to the base station 10A that is a handover destination (Procedure P33). After performing processing associated with a reception of the Handover Request, the base station 10A that is a handover destination transmits a Handover Request ACK to the base station 10B (Procedure P34). Then, the base station 10B makes a request for the mobile terminal 5 to perform a handover by transmitting an RRC Connection Reconfiguration. (Procedure P35). Further, the base station 10B reports a sequence number for a packet that is to be transmitted to the mobile terminal 5 next, by transmitting an SN Status Transfer to the base station 10A

(Procedure P36). After that, synchronization processing is performed between the base station 10A and the mobile terminal 5 (Procedure P37).

When it succeeds in a hand-in to a cell formed by the base station 10A, the mobile terminal 5 transmits an RRC Connection Reconfiguration Complete to the base station 10A (Procedure P38). In this case, an RRC Connection Reconfiguration Complete is an example of a request message. In other words, when it is not able to hand-in to the macrocell AAA because Procedure P37 has not been successfully performed, the mobile terminal 5 does not transmit an RRC Connection Reconfiguration Complete. Thus, when receiving an RRC Connection Reconfiguration Complete, a handover processing unit 16A of the base station 10A determines that it has detected a hand-in. Then, the handover processing unit 16A reports the hand-in to an adjuster 17A, and the adjuster 17A generates, by the procedure that has been described with reference to FIG. 17, a message to be transmitted to the mobile terminal 5 using position information. This message may include, for example, information recorded in the position information table 21A illustrated in FIG. 16. The base station 10A reports the position information to the mobile terminal 5 by transmitting the generated message (Procedure P39).

After that, the base station 10A makes a request for a switching of path by transmitting a Path Switch Request to a Mobility Management Entity (MME) (Procedure P40). The MME reports to a Serving Gateway (SGW) that the mobile terminal 5 will communicate with the base station 10A, by transmitting a User Plane Update Request (Procedure P41). When receiving the User Plane Update Response from the SGW, the MME transmits a Path Switch Request ACK to the base station 10A (Procedures P42, P43). Then, the base station 10A transmits a UE Context Release to the base station 10B (Procedure P44).

FIG. 18 is just an example of a method for detecting a hand-in, and the method for detecting a hand-in may be changed according to the implementation. The processes of and after Procedure P38 are not performed when the mobile terminal 5 is not able to perform a handover. Thus, for example, when transmitting a message by performing Procedure P40 or Procedure P44, the handover processing unit 16 of the base station 10 that is a handover destination may be modified so as to detect a hand-in. Likewise, when receiving the Path Switch Request ACK from the MME, the handover processing unit 16 may be modified so as to detect a hand-in. When a hand-in is detected by any of the procedures except for Procedure P38, the base station 10 transmits a message including position information to the mobile terminal 5 after detecting a hand-in.

[Processing in Mobile Terminal 5]

Next, an example of processing performed by the mobile terminal 5 after position information is received from the base station 10 will be described. Also in the following description, it is assumed that the mobile terminal 5 hands over from the base station 10B to the base station 10A. In this case, the mobile terminal 5 hands-in to the macrocell AAA. In the following description, a case in which the base station 10 reports, to the mobile terminal 5, not only position information of a small cell that can be a move destination but also a frequency bandwidth and a cell radius, but even when the base station 10 does not report, for example, a cell radius, processing similar to the following is performed.

A position information table 71a of FIG. 19 is an example of the position information table 71 which the mobile terminal 5 holds when starting processing for performing a hand-in to the macrocell AAA. When starting a handover to the base station 10A, the mobile terminal 5 holds position information on a small cell to which it may move from the cell BBB formed by the base station 10B. Thus, like the position information table 21B of FIG. 16, the position information table 71a holds the information on the cell bbb, the cell ddd, and the cell fff.

It is assumed that the mobile terminal 5 hands-in to the macrocell AAA, as described with reference to FIG. 18. Then, the base station 10A generates a message including position information with reference to the position information table 21A (FIG. 19) and transmits it to the mobile terminal 5. When receiving the message including position information from the base station 10, the receiver 51 of the mobile terminal 5 outputs it to the update unit 61. The update unit 61 determines whether the position information included in the message received from the base station 10 is identical to the information in the position information table 71a. When there is a difference between the position information included in the message received from the base station 10 and the information in the position information table 71a, the update unit 61 deletes the information recorded in the position information table 71. Further, the update unit 61 records the position information input from the receiver 51 in the position information table 71. In the example of FIG. 19, the position information table 71a held by the mobile terminal 5 and the position information table 21A are different, so position information different from the position information table 71a is reported to the mobile terminal 5. Then, the update unit 61 updates the position information table 71a to a position information table 71b using the information input from the base station 10A. Here, when the position information received from the base station 10 is different from the content of the position information table 71, the update unit 61 not only adds newly reported information on a small cell but also deletes the information on a small cell that has not been reported from the base station. As a result, from among the small cells that could be a move destination before a handover, the mobile terminal 5 is able to delete the information on a small cell that is no longer a target as a move destination after the handover.

Figure 20:
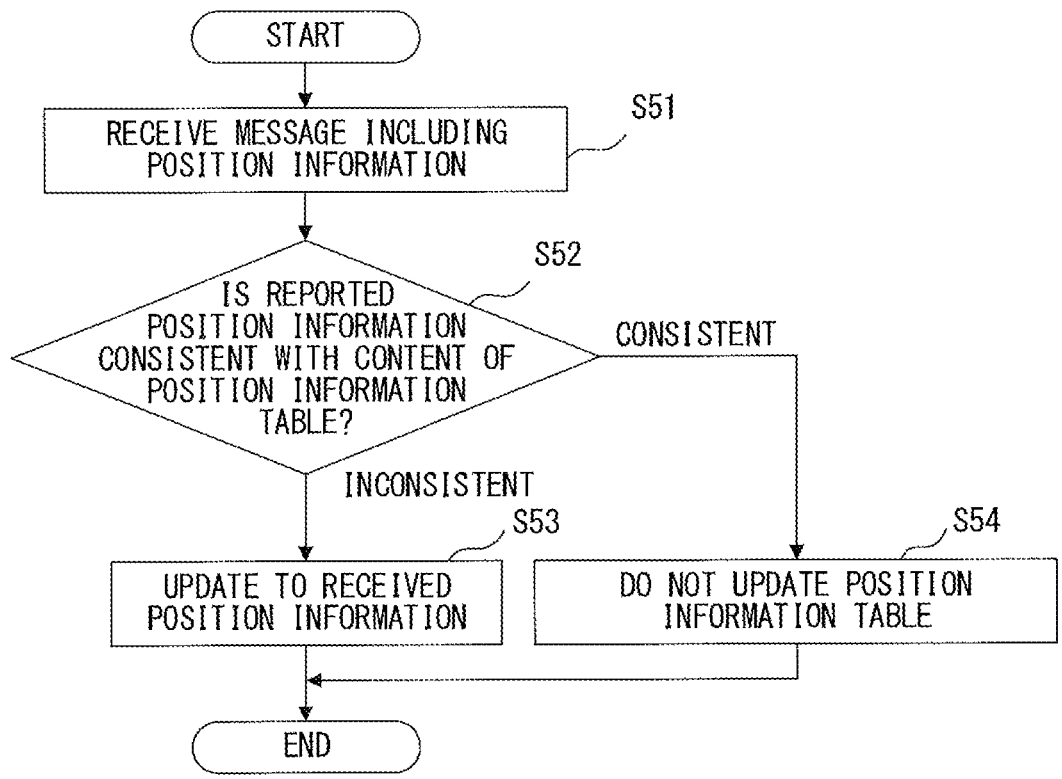
FIG. 20 is a flowchart that illustrates an example of processing of updating the position information table.

FIG. 20 is a flowchart that illustrates an example of processing of updating the position information table 71. The receiver 51 receives a message including position information from the base station 10 (Step S51). The receiver 51 outputs the message to the update unit 61. The update unit 61 determines whether the position information reported from the base station 10 by use of the message is consistent with the content of the position information table 71 (Step S52). When the reported position information is not consistent with the content of the position information table 71, the update unit 61 updates the content of the position information table 71 so that the content of the position information table 71 is consistent with the received position information (INCONSISTENT in Step S52, Step S53). On the other hand, when the reported position information is consistent with the content of the position information table 71, the update unit 61 ends the processing without updating the position information table 71 (CONSISTENT in Step S52, Step S54).

FIG. 21 is a sequence diagram that illustrates an example of a handover by use of a positional information table. FIG. 21 illustrates an example of processing in which, after it hands-in to the macrocell AAA, the mobile terminal 5 moves within the macrocell AAA, approaches the small cell ccc, and then hands over to the base station 10c. In FIG. 21, the mobile terminal 5 uses the position information table 71b (FIG. 19).

The procedure P51 is performed as follows. The identification unit 62 identifies a current position of the mobile terminal 5. The identification unit 62 includes, for example, a GPS, so as to obtain the longitude and latitude indicating the position of the mobile terminal 5 using data of the GPS. The identification unit 62 outputs the values of the longitude and latitude indicating the position of the mobile terminal 5 to the detector 63. The detector 63 calculates a distance between a position of a base station 10 of each cell recorded in the position information table 71 and a position of the mobile terminal 5, using the values of the longitude and latitude. It is assumed that the distance between the mobile terminal 5 and the base station 10c is not greater than a threshold as a result of a movement of the mobile terminal 5.

The procedure P52 is performed as follows. The detector 63 reports, to the base station 10A with which communication has been established, that the mobile terminal 5 has approached the small cell ccc, by transmitting report information. The report information may be any message that can be used for reporting that the mobile terminal 5 has approached a cell that can be a move destination. For example, the detector 63 is able to report to the base station 10A using a Proximity Indication. The detector 63 creates a message to be transmitted to the base station 10A and outputs it to the transmitter 52. The transmitter 52 transmits the message input from the detector 63 to the base station 10A.

The procedure P53 is performed as follows. The handover processing unit 16A of the base station 10A transmits, to the mobile terminal 5, information for obtaining a physical cell ID of a base station 10 forming a cell that can be a move destination, according to the report from the mobile terminal 5. in this case, the base station 10A transmits, to the mobile terminal 5, information to be used when obtaining a physical cell ID of the small cell ccc.

As described with reference to, for example, FIG. 7, while the frequency bandwidth of the macrocell AAA is 2.2 GHz, 800 MHz is used in the small cell ccc. Further, a physical cell ID is used in order for the mobile terminal 5 to start communication through the small cell ccc. Thus, the base station 10A can be thought to report, by Procedure P53, to the mobile terminal 5, information which the mobile terminal 5 uses to start communication in the frequency bandwidth used for communication in the small cell ccc.

The procedure P54 is performed as follows. The handover processing unit 64 obtains the physical cell ID of the small cell ccc by use of the information reported from the base station 10A, and reports it to the base station 10A.

The procedure P55 is performed as follows. The handover processing unit 16A of the base station 10A makes a request for the mobile terminal 5 to report the information on a small cell that is a move destination (System Information, SI).

The procedure P56 is performed as follows. The handover processing unit 64 of the mobile terminal 5 receives notification information that is notified from the base station 10c, and obtains information such as a CGI (Cell Global Identity) and a TAI (Tracking Area Identify).

The procedure P57 is performed as follows. The handover processing unit 64 transmits the obtained information to the base station 10A.

The procedure P58 is performed as follows. Processing for the mobile terminal 5 handing over from the base station 10A to the base station 10c is performed. This processing is similar to the processing that has been described with reference to FIG. 18. When detecting that the mobile terminal 5 handed-in to the small cell ccc, the base station 10c transmits, to the mobile terminal 5, a message including the position information held by the base station 10c. Thus, in the mobile terminal 5, the position information table 71b (FIG. 19) is updated to a position information table 71c (FIG. 19) by performing a handover from the base station 10A to the base station 10c. As a result, the mobile terminal 5 is able to detect small cell that can be a move destination from the small cell ccc even when it further moves.

Figure 22:
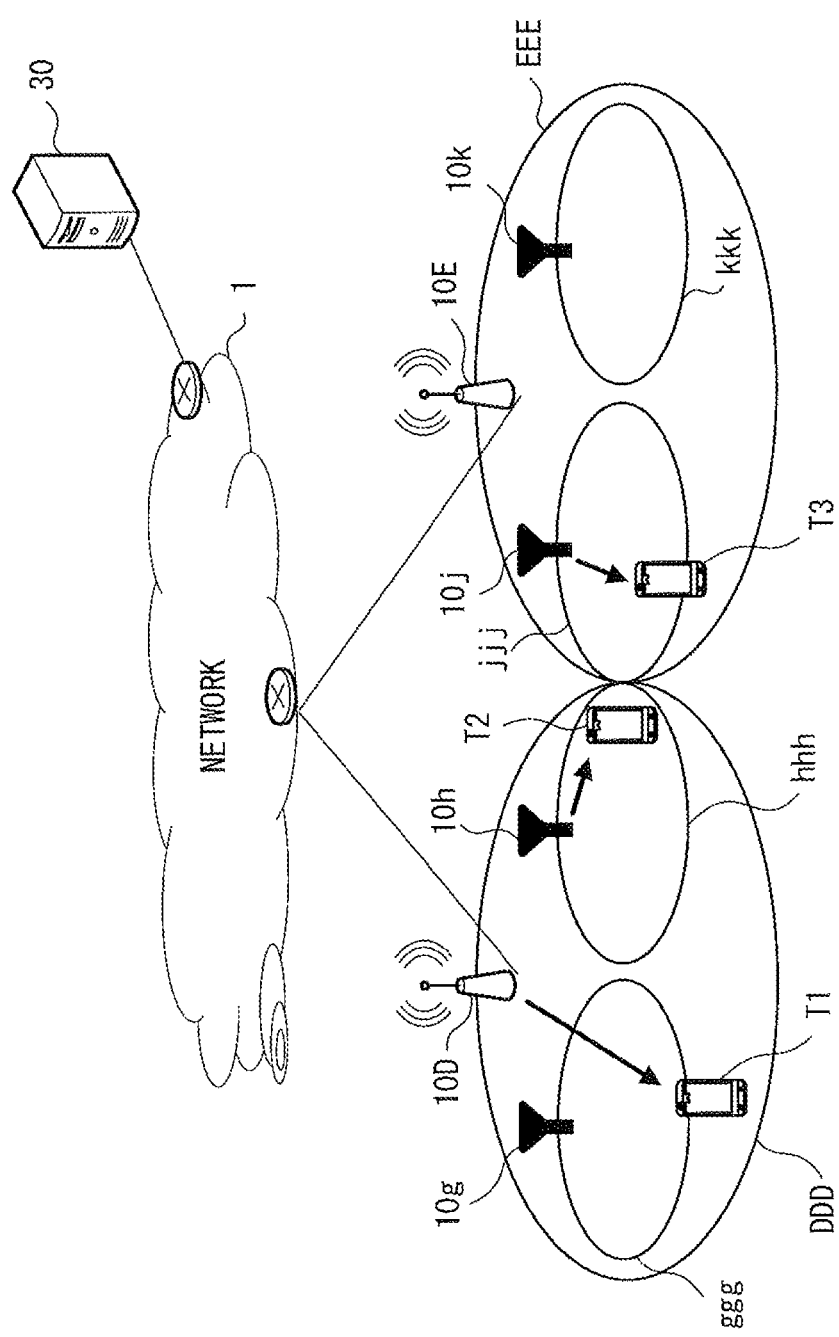
FIG. 22 illustrates an example of communication according to a first embodiment.

FIG. 22 illustrates an example of communication according to the first embodiment. In the example of FIG. 22, a macrocell DDD and a macrocell EEE are adjacent with each other. Further, a small cell ggg and a small cell hhh are in the macrocell DDD, and a small cell jjj and a small cell kkk are in the macrocell EEE. FIG. 22 illustrates a trajectory of a movement of the mobile terminal 5 from time T1 to time T3. For example, T1 indicates the position of the mobile terminal 5 at time T1.

At time T1, the mobile terminal 5 exists in the macrocell DDD and obtains information on a small cell that can be a move destination from a base station 10D. Thus, at time T1, the mobile terminal 5 obtains the position information on the small cells ggg, hhh, and jjj from the base station 10D and discards information on the other small cells. This permits the mobile terminal 5 to detect that the small cell hhh is close to it when it approaches the small cell hhh even if it has not existed the small cell hhh before.

It is assumed that, at time T2, the mobile terminal 5 moves from the macrocell DDD to the small cell hhh. At this point, a base station 10h considers the small cells ggg and jjj as a small cell that can be a move destination, and reports the positional information on those small cells to the mobile terminal 5, and the mobile terminal 5 updates the position information table 71. This processing permits the mobile terminal 5 to delete the position information on the cell hhh with which it is in communication and to use a memory efficiently.

It is assumed that, at time T3, the mobile terminal 5 moves from the small cell hhh to the small cell jjj. At this point, a base station 10j considers the small cells hhh and kkk as a small cell that can be a move destination, and reports the positional information on those small cells to the mobile terminal 5. Then, the mobile terminal 5 updates the position information table 71 using the content reported from the base station 10j, and deletes the information on the small cell ggg. Therefore, the mobile terminal 5 does not have to hold information on a cell to which it is less likely to move directly from a cell which it is using for communication at T3.

As described above, the mobile terminal 5 is able to obtain information on a small cell that can be a move destination from a base station 10 that is a handover destination. Thus, the mobile terminal 5 is able to find a small cell efficiently even if it has not exited in the small cell before. Further, the mobile terminal 5 does not have to hold positional information on a small cell to which it is less likely to move from a cell in which it is located because it updates the content of the position information table 71 according to a report from a base station 10. Thus, the mobile terminal 5 is able to use a memory efficiently. Furthermore, the mobile terminal 5 performs processing including measuring reception power and obtaining a physical cell ID when the distance to a small cell is not greater than a prescribed threshold. This permits the mobile terminal 5 to avoid consuming power by trying to obtain a physical cell ID of a small cell that is located too far for the mobile terminal 5 to perform communication with.

<Second Embodiment>

A base station 10 of a macrocell often manages a macrocell divided into a plurality of sectors. In a second embodiment, a case in which, for each sector, each base station 10 stores therein a small cell which the mobile terminal 5 may select as a move destination will be described. The second embodiment is effective when an amount of position information to be reported to the mobile terminal 5 is desired to be limited for the reason, for example, that small cells are established closer together.

The second embodiment will now be described with reference to an example of a case in which, for each sector, the server 30 identifies a small cell that can be a move destination and reports it to each base station 10. In this example, in order to facilitate explanation, it is assumed that a method for arranging sectors in one macrocell is common to all base stations 10, and that the server 30 previously holds information for identifying the method for arranging sectors. For example, in the following example, it is assumed that each macrocell is divided into six sectors at every angle of 60 degrees in the direction of north from an establishment position of a base station. Further, it is assumed that, regarding a sector number, a sector whose range is angled 60 degrees clockwise from true north that is the establishment position of a base station is set to "1", and the sector number increases by one clockwise for each sector.

Figure 23:
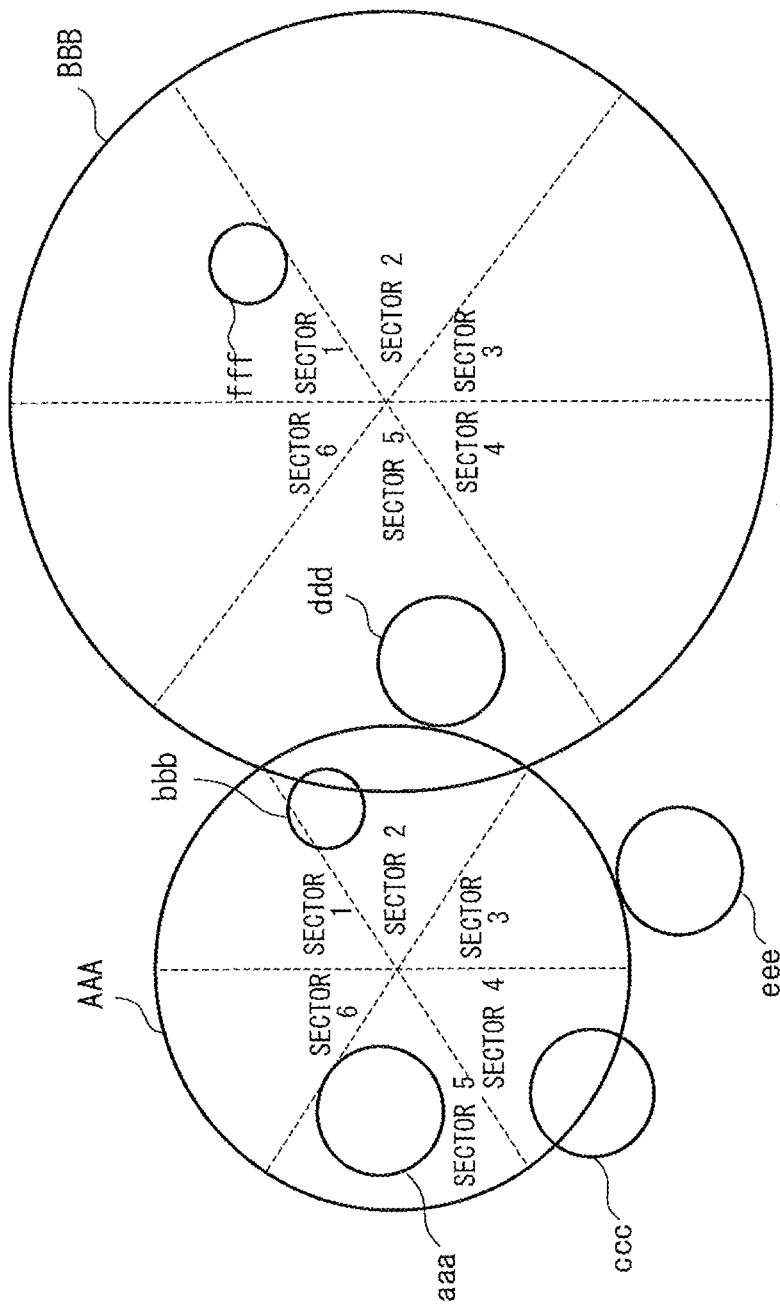
FIG. 23 illustrates an example of arrangement of macrocell sectors and small cells.

FIG. 23 illustrates an example of arrangement of macrocell sectors and small cells. In the example of FIG. 23, in a macrocell AAA, a sector 1 and a sector 2 share a certain area with a small cell bbb, and a sector 4 shares a certain area with a small cell ccc. The sector 2 of the macrocell AAA is in contact with a small cell ddd. Further, in the macrocell AAA, a sector 3 is in contact with a small cell eee, and a sector 6 is in contact with a small cell aaa. A sector 5 of the macrocell AAA includes the small cell aaa. In a macrocell BBB, a sector 1 includes a small cell fff. A sector 5 of the macrocell BBB includes a small cell ddd, and further, it shares a certain area with a small cell bbb. A sector 2 of the macrocell BBB is in contact with a small cell fff.

The update unit 32 of the server 30 updates the macrocell information table 41 and the small cell information table 42 in a way similar to that in the first embodiment. The search unit 33 allocates, for each macrocell, a small cell that can be a move destination from the macrocell (allocated small cell) by use of the procedure that has been described with reference to FIG. 9, so as to obtain the macrocell management table 43. Next, the search unit 33 determines, for each macrocell, whether the number of allocated small cells exceeds a prescribed threshold. When the number of allocated small cells exceeds the prescribed threshold, the search unit 33 maps each sector in a macrocell with small cells and identifies, for each sector, a small cell that shares one or more points with the sector. The search unit 33 records, in the macrocell management table 43, information in which an identified small cell is associated with a sector of a macrocell for each sector.

For example, it is assumed that, when each macrocell sector and small cells are arranged as illustrated in FIG. 23, the update unit 32 and the search unit 33 generate, by use of processing similar to that in the first embodiment, the macrocell management table 43c illustrated in FIG. 10. Here, it is assumed that the search unit 33 is set up so as to manage an allocated small cell for each sector when the number of allocated small cells for each macrocell is more than or equal to three. In this case, the number of allocated small cells is more than or equal to three both in the macrocells AAA and BBB, so the search unit 33 determines to manage an allocated small cell for each sector. The search unit 33 identifies the arrangement illustrated in FIG. 23 by mapping the sectors of the macrocell AAA and the macrocell BBB with positions of small cells. Further, for example, the search unit 33 identifies that a small cell that shares one or more points with the sector 1 of the macrocell AAA is the small cell bbb. Similar identification processing is performed for the other sectors, and the macrocell management table 43c (FIG. 10) is updated to a macrocell management table 43d illustrated in FIG. 24.

Further, when a request for a switching to a management of a small cell for each sector has been made with respect to a certain macrocell, the server 30 manages a small cell for each sector. A method for generating the macrocell management table 43 and the small cell management table 44 is similar to when the number of small cells exceeds the threshold. The server 30 may receive, from another device, a request for a switching to a management of a small cell for each sector, or may receive the request from an operator through the input device 123.

Figure 25:
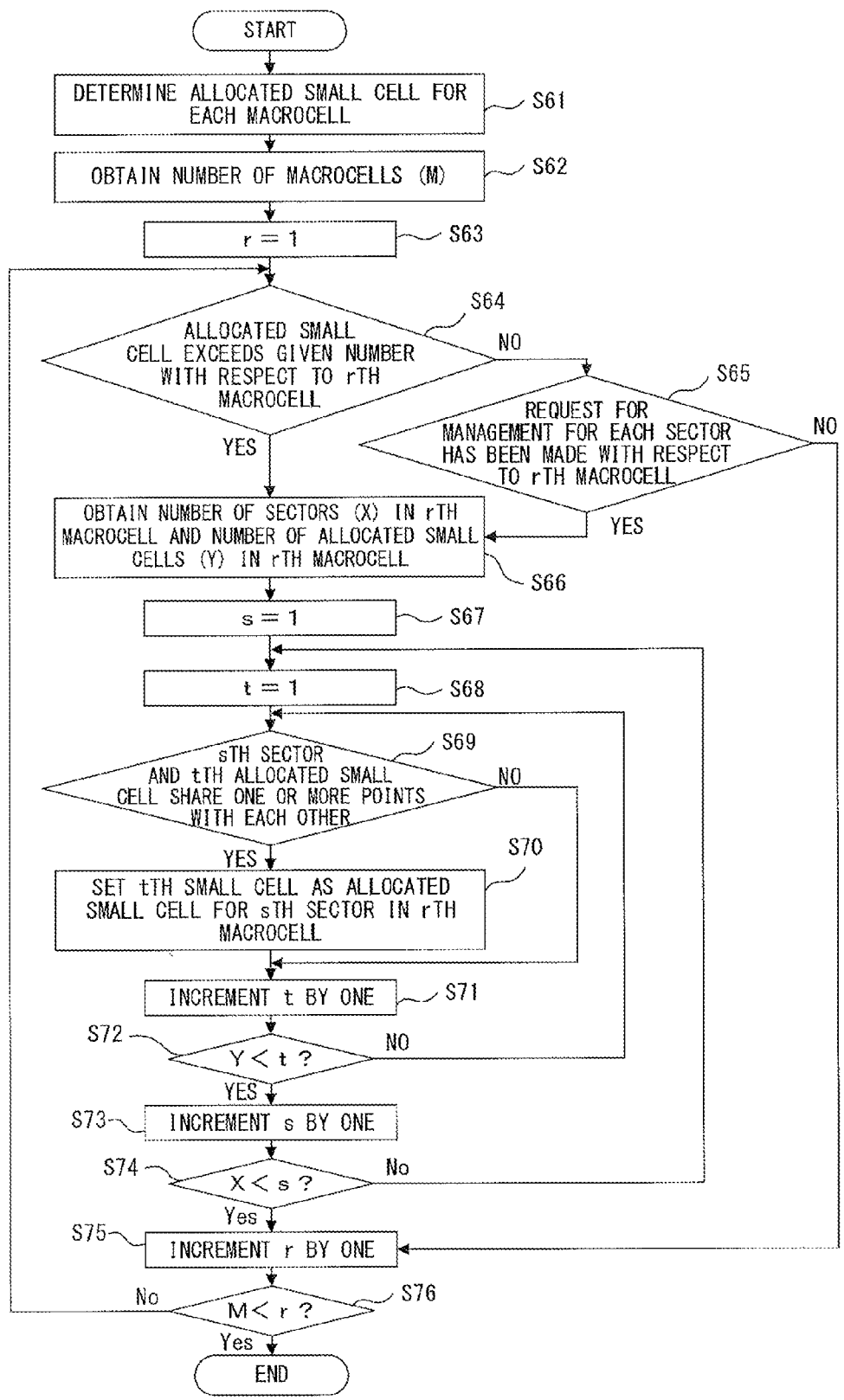
FIG. 25 is a flowchart that illustrates an example of processing performed by a search unit according to a second embodiment.

FIG. 25 is a flowchart that illustrates an example of processing performed by the search unit 33 according to the second embodiment. FIG. 25 illustrates an example of a method for updating the macrocell management table 43. FIG. 25 is just an example, and changes may be made to, for example, the order of Step S62 and Step S63. Further, variables r, s, and t are used in the processing of FIG. 25. In this case, r is a variable that identifies a macrocell, s is a variable that identifies a sector, and t is a variable that identifies a small cell.

The search unit 33 determines an allocated small cell for each macrocell (Step S61). The process of Step S61 is as described with reference to FIG. 9. The search unit 33 obtains the number of macrocells M and sets the variable r to one (Steps S62, S63). The search unit 33 determines whether an allocated small cell exceeds a predetermined threshold with respect to an rth macrocell (Step S64). When the allocated small cell does not exceed the predetermined threshold, the search unit 33 determines whether a request for a management for each sector has been made with respect to the rth macrocell (No in Step S64, Step S65).

When the allocated small cell exceeds the predetermined threshold, the search unit 33 obtains the number of sectors (X) in the rth macrocell and the number of allocated small cells (Y) in the rth macrocell (Yes in Step S64, Step S66). Likewise, when a request for a management for each sector has been made with respect to the rth macrocell, the search unit 33 also obtains the number of sectors and the number of small cells with respect to the rth macrocell (Yes in Step S65, Step S66). The search unit 33 sets both the variables s and t to 1 (Steps S67, S68). The search unit 33 determines whether an sth sector and a tth allocated small cell share one or more points with each other (Step S69). When the sth sector and the tth allocated small cell share one or more points with each other, the search unit 33 sets the tth small cell as an allocated small cell for the sth sector (Yes in Step S69, Step S70).

After that, the search unit 33 increments the value of the variable t by one and determines whether the variable t is greater than the number of allocated small cells (Y) in a macrocell to be processed (Steps S71, S72). When the variable t is not greater than Y, the search unit 33 repeats the processes of and after Step S69 (No in Step S72). When the variable t exceeds Y, the search unit 33 increments the value of the variable s by one and determines whether the variable s is greater than the number of sectors (X) in a macrocell to be processed (Yes in Step S72, Steps S73, S74). When the variable s is not greater than X, the search unit 33 repeats the processes of and after Step S68 (No in Step S74). When the variable s exceeds X, the search unit 33 increments the value of the variable r by one and determines whether the variable r is greater than the number of macrocells (M) (Yes in Step S74, Steps S75, S76). When the variable r is not greater than M, the search unit 33 repeats the processes of and after Step S64 (No in Step S76). On the other hand, when the variable r exceeds M, the search unit 33 ends the processing (Yes in Step S76). When it determines that a request for a management for each sector has not been made with respect to the rth macrocell, the search unit 33 performs the processes of and after Step S75 so as to change the macrocell to be processed (No in Step S65).

When the update of the macrocell management table 43 is completed, the search unit 33 updates the small cell management table 44. When it determines an allocated small cell for each macrocell sector, the search unit 33 sets, as an allocated small cell for a certain small cell, a small cell to which the mobile terminal 5 is able to move from the same sector as the sector to which the certain small cell is allocated. For example, it is assumed that the macrocell management table 43d (FIG. 24) has been obtained. In this case, even when searching in the field of an allocated small cell using the small cell aaa as a key, the search unit 33 is not able to find a sector in which a plurality of small cells are designated as an allocated small cell. As a result, the search unit 33 determines that there is not a small cell that can be a move destination from the small cell aaa, and does not set an allocated small cell for the small cell aaa, as illustrated in FIG. 26. The search unit 33 also performs similar processing for the small cell ccc, the small cell eee, and the small cell fff.

When the search unit 33 searches in the field of an allocated small cell using the small cell bbb as a key, it is possible to determine that the small cell bbb and the small cell ddd are an allocated small cell in the sector 2 of the macrocell AAA. Thus, the search unit 33 determines that there is a possibility that the mobile terminal 5 will move from the small cell bbb to the small cell ddd, and sets the small cell ddd as an allocated small cell of the small cell bbb, as illustrated in FIG. 26. The search unit 33 also determines that the small cell bbb and the small cell ddd are an allocated small cell in the sector 5 of the macrocell BBB. In this case, the small cell ddd is already an allocated small cell of the small cell bbb because the data in the sector 2 of the macrocell AAA has been processed, so the small cell management table 44 is not updated. The search unit 33 also performs similar processing for the small cell ddd.

Figure 27:
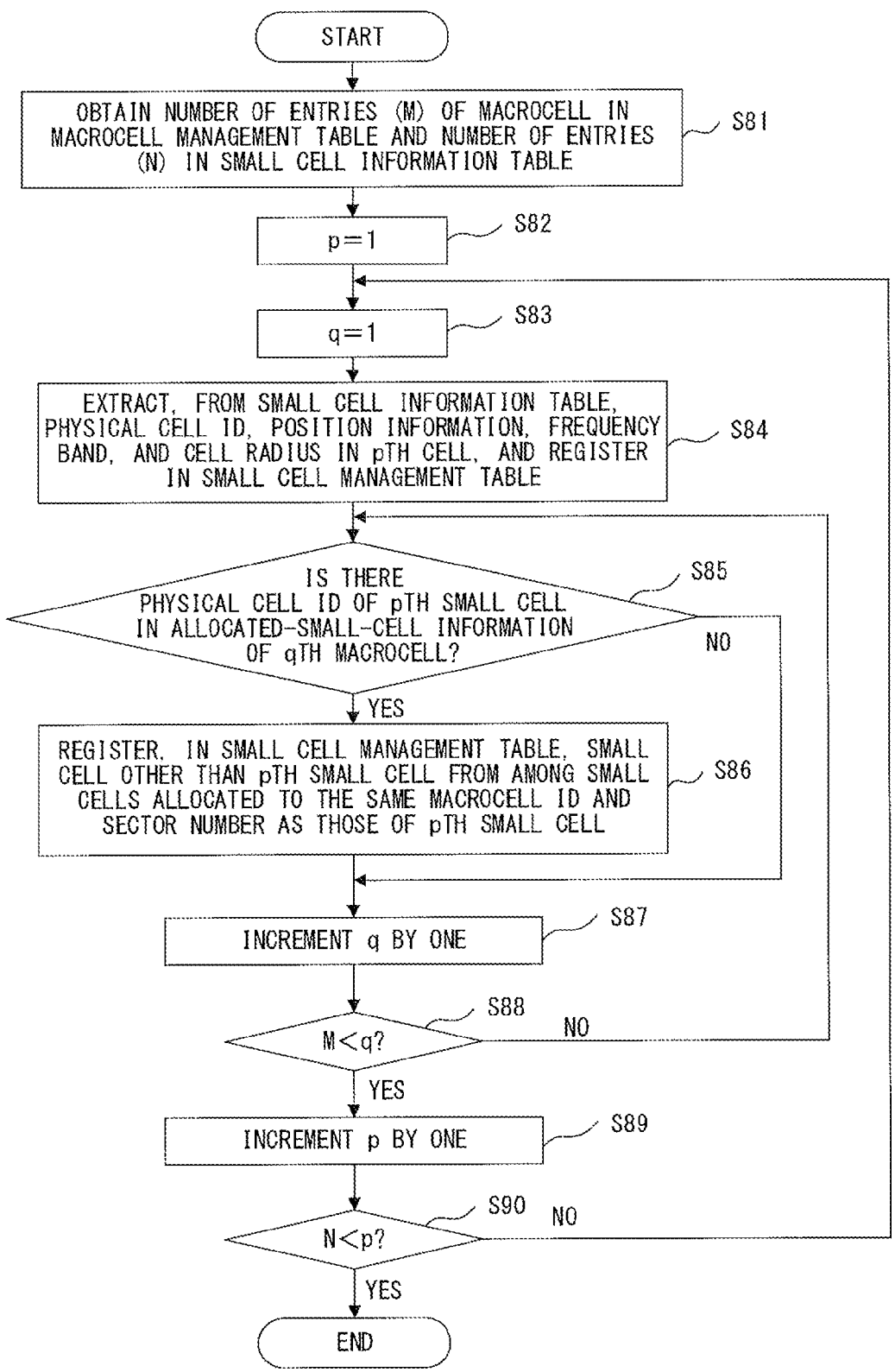
FIG. 27 is a flowchart that illustrates an example of processing performed by the search unit according to the second embodiment.

FIG. 27 is a flowchart that illustrates an example of processing performed by the search unit 33 according to the second embodiment. The processes of Steps S81 to S85 in FIG. 27 are similar to those of Steps S31 to S35 in FIG. 11. When the pth small cell is included as an allocated small cell in the entry of the qth macrocell in the macrocell management table 43, the search unit 33 determines a small cell allocated to the same sector as the pth small cell (Yes in Step S85). From among the small cells allocated to the same sector in the same macrocell as the sector to which the pth small cell is allocated, the search unit 33 sets a small cell other than the pth small cell as an allocated small cell of the pth small cell (Step S86). The processes of Steps S87 to S90 are similar to those of Steps S37 to S40 in FIG. 11.

A report of move-destination-cell information from the server 30 to each base station 10, a report of position information from the base station 10 to the mobile terminal 5, and processing performed by the mobile terminal 5 are similar to those in the first embodiment. However, in the second embodiment, the server 30 reports an allocated small cell for each sector. Thus, for example, the base station 10A obtains, from the server 30, information associated with a physical cell ID=AAA from among the pieces of information in FIG. 24. Further, the base station 10 determines an identifier of a sector used for communication with the mobile terminal 5, and transmits position information associated with the sector according to the mobile terminal 5 that is a communication destination. Thus, for example, in the arrangement illustrated in FIG. 23, the base station 10A reports the information on the small cell bbb to the mobile terminal 5 that is in communication in the sector 1 of the macrocell AAA, but does not transmit the information on the other small cells. The information on the sector used by the base station 10 for communication with the mobile terminal 5 is identified using any method for, for example, identifying from the position information on the mobile terminal 5.

As an example, a case in which one macrocell is divided into six sectors has been be described in the second embodiment, but any change maybe made to the number of sectors included in one macrocell according to the implementation. Further, a threshold used for determining whether a management of a small cell is to be changed from for each cell to for each sector may also be set discretionally according to the implementation.

As described above, in the second embodiment, each base station 10 stores therein, for each sector, a small cell which the mobile terminal 5 may select as a move destination, which permits suppressing of an amount of position information to be reported to the mobile terminal 5. Thus, the base station 10 is able to report, to the mobile terminal 5, only position information on a small cell which the mobile terminal 5 is relatively more likely to select as a move destination.

<Third Embodiment>

In a third embodiment, a case in which a timing for reporting position information from the base station 10 to the mobile terminal 5 can be changed. In the third embodiment, a method for determining an allocated small cell in the server 30 may be as is the case in any of the first or second embodiment. Further, a report of move-destination-cell information from the server 30 to each base station 10 and processing in the mobile terminal 5 are same as those in the first embodiment.

In order to avoid transmitting position information from a base station 10 to a mobile terminal 5 that is less likely to use the position information, the adjuster 17 of the base station 10 sets, to an information transmission list, a time period from when a mobile terminal 5 hands-in until position information is transmitted. For example, a mobile terminal 5 that moves fast stays in a cell formed by the base station 10 for a short time period, and there is a good possibility that it will not access a small cell in the proximity. Further, when the base station 10 is established, for example, near a station or an expressway, a mobile terminal 5 that will hand-in stays for a short time period, and there is a good possibility that it will not access a small cell. Thus, the adjustor 17 is able to adjust a timing for transmitting position information according to the number of handovers to the base station 10 or a moving speed of the mobile terminal 5.

FIG. 28 illustrates an example of an information transmission list. The information transmission list includes information for determining a timing for transmitting position information for each mobile terminal 5 that hands-in to a cell formed by the base station 10. In the example of FIG.

28, two types of timers, a "base station timer" and a "speed timer", are used. A "priority timer" represents information that indicates which of the two types of timers is used preferentially. A "timer" represents a count value that is a time elapsed from a hand-in. When a setting time of a timer that is used preferentially is identical to a count value (a time elapsed) in the "timer", the adjustor 17 transmits position information to the mobile terminal 5.

The "base station timer" is a common value determined for each base station 10. The adjustor 17 of the base station 10 counts the number of occurrences of a handover in the base station 10, and compares the number of handovers that occurred within a certain time period with a threshold Th. When the number of handovers that occurred within a certain time period exceeds the threshold Th, the adjustor 17 makes a value of the "base station timer" larger. For example, it is assumed that the value of the "base station timer" is zero seconds in an initial setting of a base station 10. Then, when the "base station timer" is given priority, the base station 10 transmits position information to the mobile terminal 5 when triggered by the mobile terminal 5 handing-in. When the number of handovers that occurred within a certain time period exceeds the threshold Th, the adjustor 17 makes the value of the "base station timer" larger. For example, it is assumed that the adjustor 17 sets the value of the "base station timer" to five seconds, as illustrated in FIG. 28. Then, even when the mobile terminal 5 hands-in, the adjustor 17 does not report position information to the mobile terminal 5 before five seconds elapses from the hand-in. The number of handovers that occur within a certain time period may be compared with a plurality of thresholds. In this case, the setting value of the "base station timer" is larger if the value of the number of handovers that occurred within a certain time period is larger.

The "speed timer" is a timer that is set for each mobile terminal 5. The adjustor 17 obtains a moving speed of the mobile terminal 5 that has handed-in. Any method for obtaining a moving speed of a mobile terminal 5 may be used. For example, when the base station 10 includes the calculator 18, the calculator 18 calculates a speed of the mobile terminal 5 at a time of a hand-in, and outputs, to the adjustor 17, the obtained value in association with an identifier of the mobile terminal 5. Further, the base station 10 may obtain a moving speed from the base station 10 that is a handover source to the mobile terminal 5 when handover processing is performed. The adjustor 17 previously holds information in which a moving speed of the mobile terminal 5 and a setting value of the "speed timer" are associated. The setting value of the "speed timer" is larger if the moving speed of the mobile terminal 5 is faster. In the example of FIG. 28, mooring speeds of terminals identified by the terminal identifiers 1111111 and 44444444 are smaller than a moving speed of a terminal identified by the terminal identifier 22222222. Thus, the adjustor 17 sets the "speed timer" to zero seconds for the terminals identified by the terminal identifiers 1111111 and 44444444, and sets the "speed timer" to five seconds for the terminals identified by the terminal identifier 22222222. Further, a moving speed of a terminal identified by the terminal identifier 333333333 is faster than those of the other terminals, so the "speed timer" is set to ten seconds.

In the example of FIG. 28, the "priority timer" indicates a "speed timer" for all terminals. Then, the adjustor 17 transmits position information to the mobile terminal 5 when the value of a time elapsed from a hand-in is identical to the value of a setting time of the "speed timer". Thus, the adjustor 17 transmits, at a time of a hand-in, position information to the terminals identified by the terminal identifiers 11111111 and 44444444. On the other hand, the adjustor 17 transmits, five seconds after a hand-in, position information to the terminal identified by the terminal identifier 22222222, and transmits, ten seconds after a hand-in, position information to the terminal identified by the terminal identifier 33333333.

FIG. 29 is a sequence diagram that illustrates an example of a method for reporting position information according to the third embodiment. Procedures P61 and P62 are similar to Procedures P21 and P22 that have been described with reference to FIG. 17.

The procedure P63 is performed as follows. When a hand-in is reported, the adjustor 17 adds, to an information transmission list, information on a mobile terminal 5 that has handed-in. A method for setting an information transmission list is as described with reference to FIG. 28.

The procedure P64 is performed as follows. When the registration in the information transmission list is completed, the adjuster 17 obtains position information by accessing the position information table 21 in the storage 20. The adjuster 17 generates a message to be transmitted to the mobile terminal 5 using the obtained position information.

The procedure P65 is performed as follows. The adjuster 17 refers to the information transmission list and holds the message until the transmission time for the generated message.

The procedure P66 is performed as follows. When the value of the "timer" is identical to the value of the setting time of a timer that is used preferentially, the adjuster 17 outputs the message including the position information to the transmitter 14

The procedure P67 is performed as follows. The transmitter 14 transmits the message input from the adjuster 17 to the mobile terminal 5. The mobile terminal 5 updates the position information table 71 using the message received from the base station 10.

In the third embodiment, using a moving speed of a mobile terminal 5, the base station 10 determines whether the mobile terminal 5 is more likely to use reported position information. Further, with respect to a mobile terminal 5 that is less likely to use position information, the adjuster 17 sets the time from a hand-in until the position information is transmitted longer. There is a possibility that a mobile terminal 5 that moves fast moves outside a communication area of the base station 10 before receiving the position information from the base station 10, and in this case, the mobile terminal 5 does not perform processing including receiving position information that is unlikely to be used and holding the position information. This permits a reduction in the processing burden of the mobile terminal 5.

<Others>

The embodiments of the present invention are not limited to the configurations or the methods mentioned above, and various modifications may be made thereto. Some other examples will be described below.

In the first embodiment to the third embodiment, a case in which the base station 10 obtains position information from the server 30 has been described, but the base station 10 may obtain position information from a device other than the server 30.

For example, it is assumed that the server 30 or the base station 10 may obtain transmission power in each base station 10 instead of a cell radius. In this case, a distance in which a value of reception power $P_R$ is less than a prescribed threshold can be set as a cell radius, using the following formula.

$$P_R = \left(\frac{\lambda}{4\pi D}\right)^2 G_T G_R P_T$$

In this case, $P_T$ is transmission power (W), $G_R$ is a receive gain, $G_T$ is a transmit gain, $\lambda$ is a wavelength, and D is a distance.

In order to reduce the processing burden caused by the frequent occurrence of a handover, a modification may be made so that it is determined whether the mobile terminal 5 performs processing of updating the position information table 71 by use of the number of occurrences of a handover per unit of time. In this case, it is assumed that the update unit 61 counts the number of occurrences of a handover per unit of time. When the number of occurrences of a handover exceeds a prescribed threshold, the update unit 61 does not update the position information table 71 even if position information is reported from the base station 10. When the position information table 71 is not updated, there is a possibility that a small cell is not detected precisely, but the processing burden of the mobile terminal 5 is reduced because processing related to, for example, an update of the position information table 71 is not performed. Further, the update unit 61 monitors the amount of power remaining in the mobile terminal 5, and when the amount of remaining power is low, power consumption can be reduced by stopping updating the position information table 71. The mobile terminal 5 to which such a modification has been made is suitable for use in a location in which established small cells are large enough in number so that a small cell can be found without updating the position information table 71. Further, the mobile terminal 5 to which such a modification has been made can be used in combination with the third embodiment.

In the third embodiment, the adjuster 17 may be modified so as to transmit a message including position information to the mobile terminal 5 after it is determined whether the mobile terminal 5 exists in a cell upon timer expiry. In this case, for example, the adjuster 17 is able to search in a list that has recorded therein identification information on a mobile terminal 5 in communication, using, as a key, identification information on the mobile terminal 5 to which it will transmit a message. When the mobile terminal 5 that is a transmission destination exists upon timer expiry, the adjuster 17 transmits the message to the mobile terminal 5. On the other hand, when the mobile terminal 5 that is a transmission destination does not exist upon timer expiry, the adjuster 17 stops transmitting the message to the mobile terminal 5, and discards the message. Such a modification permits a reduction in the processing burden of the base station 10 because the base station 10 does not have to transmit position information to a mobile terminal 5 that is unlikely to use the position information.

Further, a modification may be made so that a base station of a small cell also holds information on a macrocell that shares one or more points with the small cell. In this case, when the mobile terminal 5 hands-in to a small cell, information on a macrocell that shares one or more points with the small cell is also reported to the mobile terminal 5. For example, the mobile terminal 5 that has handed-in to a small cell b included in a macrocell A is able to obtain position information and a cell radius with respect to the small cell that shares one or more points with the macrocell A, position information of macrocell A, and a cell radius of the macrocell A. Then, the mobile terminal 5 is able to determine whether to enter the area of the macrocell A when it gets out of the small cell b.

The above-mentioned aspects permit a mobile terminal to find a cell efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station device that is able to perform radio communication with a mobile terminal that exists in a first cell, the base station device comprising:
   a memory that stores therein position information on a second cell that can be a move destination for the mobile terminal;
   a transmitter that transmits the position information on the second cell to the mobile terminal so as to cause the mobile terminal to detect that the mobile terminal has approached the second cell using the position information; and
   a processor that performs processing for the mobile terminal handing over from the first cell, in which communication in a first frequency bandwidth is performed, to the second cell, in which communication in a second frequency bandwidth that is different from the first bandwidth is performed, wherein
   the transmitter transmits information which the mobile terminal uses to start communication in the second frequency bandwidth after receiving, from the mobile terminal, a report that the mobile terminal has approached the second cell.

2. The base station device according to claim 1, further comprising
   a receiver that receives, from the mobile terminal, a request message that makes a request for a start of communication by use of the first cell, wherein
   the transmitter transmits the position information to the mobile terminal when the receiver receives the request message.

3. The base station device according to claim 1, further comprising:
   a receiver that receives, from the mobile terminal, a request message that makes a request for a start of communication by use of the first cell, wherein
   the processor
     calculates a moving speed of the mobile terminal,
     makes adjustment so that a time interval from the reception of the request message until the transmission of the position information is longer when the moving speed is faster, wherein
   the transmitter transmits the position information to the mobile terminal when the time interval has elapsed.

4. The base station device according to claim 1, wherein
   the memory stores therein a sector identifier that identifies each sector being obtained by dividing the first cell in association with a cell that shares at least one point with the sector identified by the sector identifier, and the transmitter reports, to the mobile terminal, positon information on the cell that shares at least one point with a sector in which the mobile terminal is located.

5. A mobile terminal that is able to communicate with a base station device in a first cell, the mobile terminal comprising:
a receiver that receives, from the base station device, position information on a second cell that can be a move destination from the first cell;
a processor that
identifies a position of the mobile terminal, and
detects that the mobile terminal has approached the second cell using the position information and the position of the mobile terminal;
a transmitter that transmits, to the base station device, report information that reports that the mobile terminal has approached the second cell, wherein
the processor performs processing for handing over from the first cell, in which communication in a first frequency bandwidth is performed, to the second cell, in which communication in a second frequency bandwidth is performed,
the transmitter transmits the report information to the base station device using the first frequency bandwidth,
the receiver receives, from the base station device, start information that is used to start communication in the second frequency bandwidth after the transmitter transmits the report information, and
the processor hands over from the first cell to the second cell using the start information.

6. The mobile terminal according to claim 5, wherein
the first cell is divided into a plurality of sectors and the mobile terminal is located in a sector to be communicated with from among the plurality of sectors, and
the receiver obtains position information on a cell that shares at least one point with the sector to be communicated with.

7. The mobile terminal according to claim 5, wherein
the processor detects the second cell by detecting a cell whose distance from the position of the mobile terminal is not greater than a threshold.

8. A radio communication system comprising:
a base station device that provides a first cell; and
a mobile terminal that is able to communicate with the base station device in the first cell, wherein
the base station device transmits, to the mobile terminal, position information on a second cell that can be a move destination for the mobile terminal,
the mobile terminal
identifies a position of the mobile terminal,
detects that the mobile terminal has approached the second cell using the position information and the position of the mobile terminal,
transmits, to the base station device, report information that reports that the mobile terminal has approached the second cell, wherein
communication is performed in the first cell by use of a first frequency bandwidth,
communication is performed in the second cell in a second frequency bandwidth, wherein
when receiving the report information, the base station device transmits, to the mobile terminal, start information which the mobile terminal uses to start communication in the second frequency bandwidth, and
the mobile terminal starts communication by use of the second cell using the start information.

9. The radio communication system according to claim 8, wherein
the base station device
calculates a moving speed of the mobile terminal when receiving, from the mobile terminal, a request message that makes a request for a start of communication with the base station device,
makes adjustment so that a time interval from the reception of the request message until the transmission of the position information is longer when the moving speed is faster, and
transmits the position information to the mobile terminal when the time interval has elapsed from the reception of the request message.

\* \* \* \* \*